US010474439B2

United States Patent
Khan et al.

(10) Patent No.: US 10,474,439 B2
(45) Date of Patent: Nov. 12, 2019

(54) SYSTEMS AND METHODS FOR BUILDING CONVERSATIONAL UNDERSTANDING SYSTEMS

(71) Applicant: Microsoft Technology Licensing, LLC, Redmond, WA (US)

(72) Inventors: Omar Zia Khan, Bellevue, WA (US); Paul Anthony Crook, Bellevue, WA (US); Marius Alexandru Marin, Seattle, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 15/184,007

(22) Filed: Jun. 16, 2016

(65) Prior Publication Data
US 2017/0364336 A1 Dec. 21, 2017

(51) Int. Cl.
*G06F 8/36* (2018.01)
*G06F 8/20* (2018.01)
*G06F 8/30* (2018.01)
*G06F 8/33* (2018.01)
*G06F 3/0484* (2013.01)
*G06F 8/34* (2018.01)
(Continued)

(52) U.S. Cl.
CPC ............ *G06F 8/36* (2013.01); *G06F 3/04842* (2013.01); *G06F 8/20* (2013.01); *G06F 8/30* (2013.01); *G06F 8/33* (2013.01); *G06F 8/34* (2013.01); *G06F 16/3329* (2019.01); *G06F 17/279* (2013.01); *G10L 15/06* (2013.01); *G10L 15/22* (2013.01)

(58) Field of Classification Search
None
See application file for complete search history.

(56) References Cited

U.S. PATENT DOCUMENTS 5,694,558 A 12/1997 Sparks et al.
6,035,275 A * 3/2000 Brode ................. G10L 15/22
704/272

(Continued)

FOREIGN PATENT DOCUMENTS

EP 1679695 7/2006

OTHER PUBLICATIONS

Allen, et al., "An Architecture for More Realistic Conversational Systems", In Proceedings of 6th International Conference on Intelligent User Interfaces, Jan. 14, 2001, 8 pages.

(Continued)

*Primary Examiner* — Francisco J Aponte
*Assistant Examiner* — Mark A Gooray

(57) ABSTRACT

Systems and methods for building conversational understanding systems are provided. More specifically, the systems and methods utilize prebuilt conversational items that can form a CU system upon selection by a builder without requiring any further input from the builder. Accordingly, the systems and methods for building a conversational understanding system reduce the expertise, time, and resources necessary to build a conversational understanding system for an application when compared to systems and methods that utilize conversational items that require further input from the builder.

20 Claims, 16 Drawing Sheets

(51) Int. Cl.
  *G10L 15/06* (2013.01)
  *G10L 15/22* (2006.01)
  *G06F 16/332* (2019.01)
  *G06F 17/27* (2006.01)

(56) References Cited

U.S. PATENT DOCUMENTS

| | | | |
|---|---|---|---|
| 6,173,266 B1 * | 1/2001 | Marx | G10L 15/22 |
| | | | 704/270 |
| 6,510,411 B1 | 1/2003 | Norton et al. | |
| 7,069,220 B2 | 6/2006 | Coffman et al. | |
| 7,681,185 B2 * | 3/2010 | Kapoor | G06F 9/44521 |
| | | | 717/106 |
| 2002/0193990 A1 | 12/2002 | Komatsu | |
| 2002/0198719 A1 | 12/2002 | Gergic et al. | |
| 2005/0071853 A1 | 3/2005 | Jones et al. | |
| 2008/0319763 A1 | 12/2008 | Di Fabbrizio et al. | |
| 2010/0325605 A1 * | 12/2010 | Ding | G06Q 10/04 |
| | | | 717/105 |
| 2012/0016678 A1 | 1/2012 | Gruber et al. | |
| 2015/0039292 A1 | 2/2015 | Suleman et al. | |
| 2015/0066479 A1 | 3/2015 | Pasupalak et al. | |
| 2015/0301795 A1 | 10/2015 | Lebrun | |

OTHER PUBLICATIONS

Park, et al., "Mappings for Reuse in Knowledge-Based Systems", In Proceedings of Eleventh Workshop on Knowledge Acquisition, Modeling and Management, Apr. 18, 1998, 21 pages.

PCT International Search Report and Written Opinion in PCT/US2017/036925, dated Aug. 31, 2017, 19 pages.

McTear, European Speech Communication Association (ESCA): "Software to Support Research and Development of Spoken Dialogue Systems", 6th European Conference on Speech Communication and Technology. Eurospeech 99, Budapest, Hungary, Sep. 5-9, 1999, 4 pages.

* cited by examiner

SYSTEMS AND METHODS FOR BUILDING CONVERSATIONAL UNDERSTANDING SYSTEMS

BACKGROUND

Language understanding systems, dialog managers, and artificial intelligence are changing the way users interact with the computers. Developers of computers and applications are always trying to improve the interactions between humans and computers. However, building such systems requires significant amount of expertise, time, money, and other resources.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for building conversational understanding systems. More specifically, the systems and methods disclosed herein provide prebuilt conversational items that can form a conversational understanding system upon selection by a builder without requiring any further input from the builder. Accordingly, the systems and methods disclosed herein for building conversational understanding systems reduces the expertise, time, and resources necessary to build a conversational understanding system for an application when compared to systems and methods that utilize conversational items that require further input from the builder.

One aspect of the disclosure is directed to a system. The system includes at least one processor and a memory. The memory encodes computer executable instruction that, when executed by the at least one processor, are operative to:
  provide a library of prebuilt conversational items;
  provide a user interface for selecting one or more prebuilt conversational items from the library;
  receive a selection of at least one prebuilt conversational item from a builder to form a selected item set;
  form a conversational component based on the selected item set; and
  implement the conversational component to create the conversational understanding system.

The prebuilt conversational items include one or more task specific templates and/or one or more subtask modules. The prebuilt conversational items include preconfigured parameters, preconfigured constraints, a preconfigured inheritance, and preconfigured structure. The selected item set may be capable of implementation upon selection without requiring any further input from the builder.

Another aspect of the disclosure includes a computer readable storage medium. The computer storage medium stores computer executable instructions. The computer executable instruction when executed by a computing device, cause the computing device to perform a method. The method comprising:
  accessing a library of prebuilt conversational items;
  providing a user interface for selecting one or more prebuilt conversational items from the library;
  receiving a selection of at least one prebuilt conversational item from a builder to form a selected item set;
  receiving an implementation request from the builder via the user interface; and
  in response to the implementation request, implementing the selected item set to create a conversational understanding system.

The prebuilt conversational items include at least one or more task specific templates and/or one or more subtask modules. The prebuilt conversational items include preconfigured parameters, preconfigured constraints, a preconfigured inheritance, and/or a preconfigured structure. The selected item set is capable of implementation upon selection without requiring any further input from the builder.

Yet another aspect of the disclosure includes a method for building a conversational understanding system. The method includes:
  providing a library of prebuilt conversational items;
  providing a user interface for selecting the prebuilt conversational items from the library;
  receiving a selection of at least one prebuilt conversational item from a builder to form a selected item set;
  forming a conversational component based on the selected item set; and
  implementing the conversational component to create the conversational understanding system.

The prebuilt conversational items include one or more task specific templates and/or one or more subtask modules. The prebuilt conversational items include preconfigured parameters, preconfigured constraints, a preconfigured inheritance, and/or a preconfigured structure. The conversational component is capable of being formed and implemented without requiring any input from the builder.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with the computers. Digital assistant applications, such as Siri, Google Now and Cortana are examples of the shift in human computer interaction.

Figure 1:
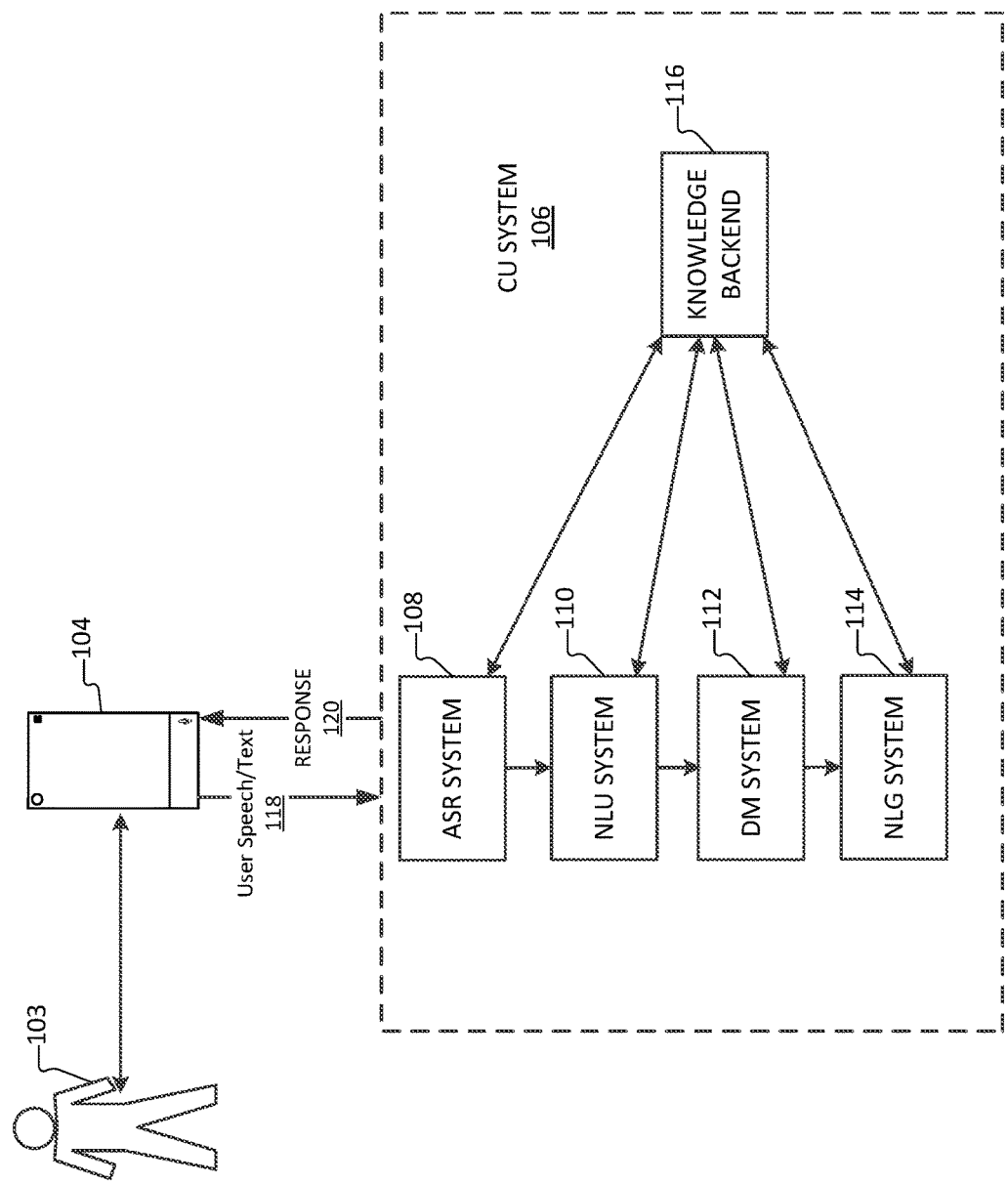
FIG. 1 is a schematic diagram illustrating a conversational understanding system being utilized by a user of a client computing device, in accordance with aspects of the disclosure.

FIG. 1 illustrates a typical conversational understanding (CU) system 106 being utilized by a user 103 of a client computing device 104, in accordance with aspects of the disclosure. A typical CU system 106 includes an automatic speech recognition (ASR) system 108, a natural language understanding (NLU) system 110, a dialog management (DM) system 112, and a natural language generation (NLG) system 114. In some aspects, the NLG system may generate multimodal output, such as spoken text, written text, and other UX/visual elements. Further, the CU system 106 either includes or communicates with a knowledge backend 116. The CU system receives user input 118, such as speech and/or text (or natural language input) from a user 103 via an interface on a client computing device 104. The CU system could also receive user input 118 from user selections, such as tapping an item from a list or circling areas on a map. The CU system 106 processes the received user input 118 utilizing the ASR system 108, the NLU system 110, the DM system 112, the NLG system 114, and the knowledge backend 116 to generate a response 120 (which can include actions) to the received user input 118. The computing device 104 presents or executes this response 120. The CU system 106 may be implemented on one or more client computing devices 104 and/or on one or more server computing devices.

As such, the CU system 106 facilitates a natural user interface or conversation exchange so users 103 can interact with an application on their computing device 104 in a natural manner. In other words, the CU system 106 provides contextual language understanding in multi-turn scenarios. This makes CU systems 106 a very natural and attractive option to integrate with various types of systems such as digital agents, bots, messaging applications, voice agents or any other application types.

However, the complexity and the resources necessary to build a CU system 106 is a bottleneck in adopting conversational interfaces more widely. For example, developers outside of the companies that created these CU systems 106 are often required to obtain a large amount of fully-labeled data. Fully-labeled data often requires a significant amount of time and resources to develop. Further, a large amount of domain expertise in dialog systems is necessary to build, configure and/or train the ASR system 108, the NLU system 110, the DM system 112, and the NLG system 114 of the CU system 106. In other words, the third party extensibility of these CU system components is often resource and expertise prohibitive. Of these components, only ASR systems 108 are available off-the-shelf for use in different applications. However, even these ASR systems 108 can be substantially more accurate if they have been trained and constrained to a particular domain or task.

While previous systems and methods have been created to simplify the task of building CU systems 106, these previous platforms still require a builder to determine and input a task, a structure for a given task, hierarchy and inheritance between parameters, tasks, and/or subtasks, and/or properties for a task and/or subtask. As such, a builder of a CU system 106 still has to have a significant amount of domain expertise, knowledge, time, and resources to create a functional CU system 106 utilizing these previous systems and methods.

There is typically no system or method that allows a third party developer to build a CU system 106 for an application without requiring a large amount domain expertise, time, and other resources. The systems and method as disclosed herein are directed to a CU system building platform that provides prebuilt conversational items that can form a CU system 106 upon selection by a builder without requiring any further input from the builder. The prebuilt conversational items create a CU system 100 with fully trained task specific ASR system 108, NLU system 110, DM system 112, and NLG system 114. Accordingly, the systems and methods as disclosed herein allow a third party developer to build a CU system 106 for digital agents, bots, messaging applications, voice agents or any other application types without requiring any domain expertise or without requiring a significant amount of time and other resources. In other words, the systems and methods as disclosed herein provides a CU building platform that enables third parties to build CU system 106 with less expertise, less time and fewer resources than required by the previously utilized CU system building platforms.

The ability of the systems and methods described herein to provide a builder with prebuilt conversational items that can form a CU system upon selection without requiring any further input from the builder creates an easy to use and efficient service or building platform for building a conversational system. Further, the ability of the systems and methods described herein to provide a builder with prebuilt conversational items that can form CU system upon selection without requiring any further input from the builder reduces the time and resources necessary to build CU system for an application when compared to previously utilized building platforms for CU systems.

Figure 2:
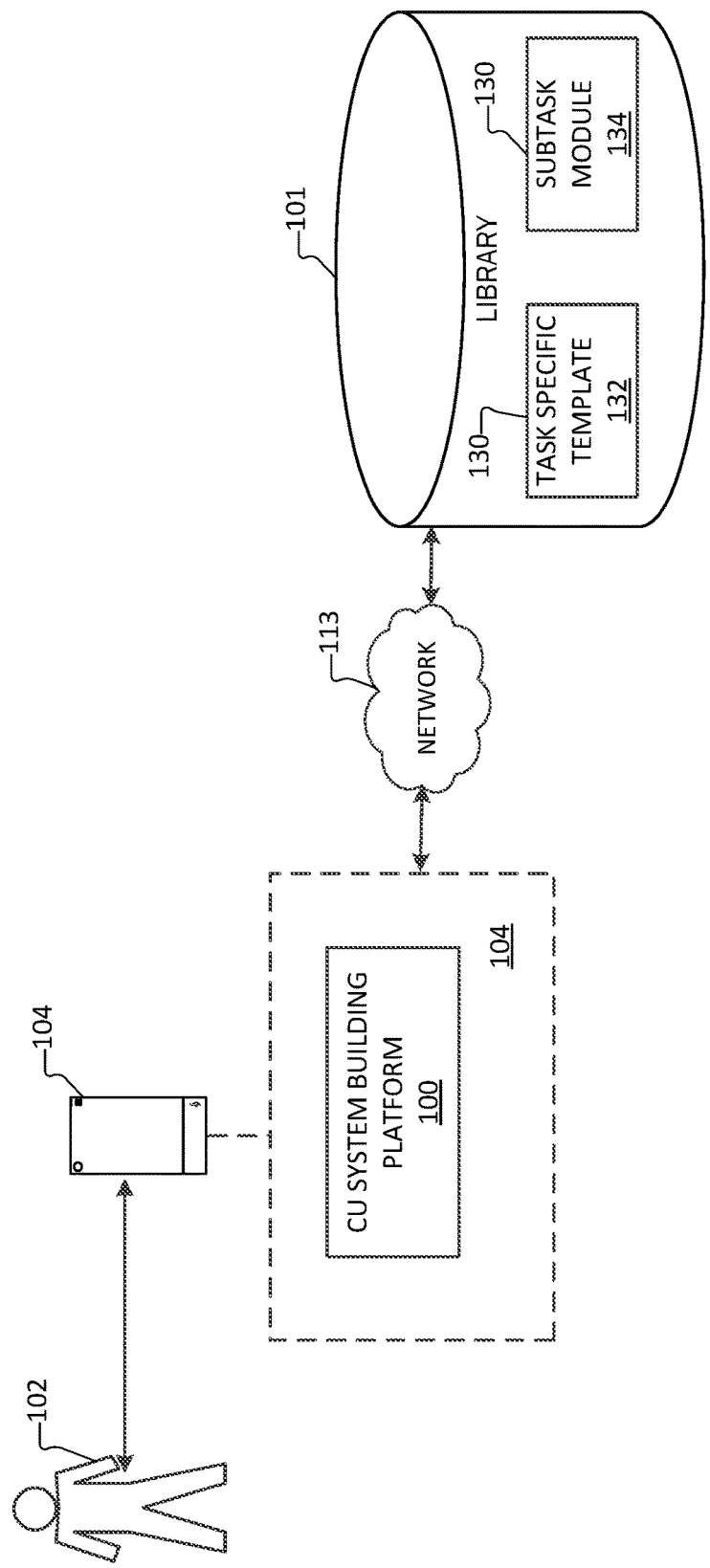
FIG. 2 is a schematic diagram illustrating a conversational understanding system building platform being utilized by a builder via a client computing device, in accordance with aspects of the disclosure.
Figure 3:
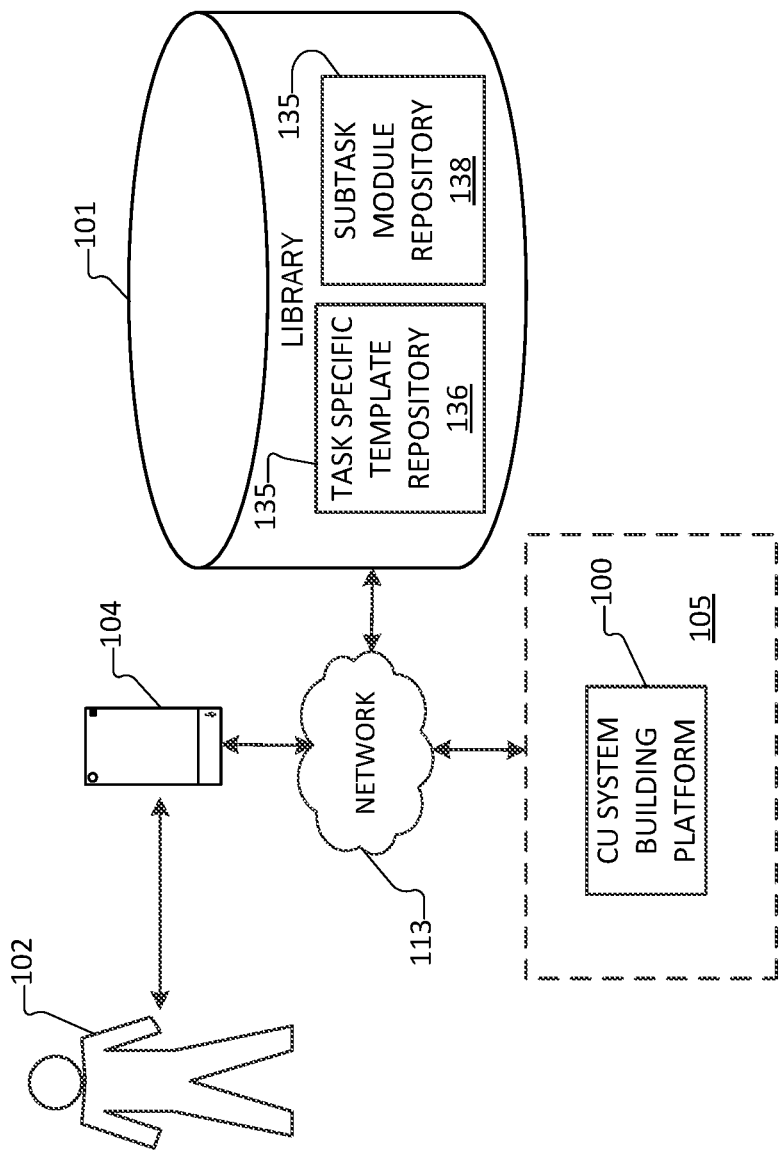
FIG. 3 is a schematic diagram illustrating a conversational understanding system building platform being utilized by a builder via a client computing device, in accordance with aspects of the disclosure.

FIGS. 2 and 3 illustrate different examples of a CU system building platform 100 being utilized by a builder 102 (or user 102 of the CU system building platform 100) via a client computing device 104, in accordance with aspects of the disclosure. In some aspects, the CU system building platform 100 is implemented on the client computing device 104 as illustrated in FIG. 2. In a basic configuration, the client computing device 104 is a computer having both input elements and output elements. The client computing device 104 may be any suitable computing device for implementing the CU system building platform 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the CU system building platform 100 may be utilized.

In other aspects, the CU system building platform 100 is implemented on a server computing device 105, as illustrated in FIG. 3. The server computing device 105 may provide data to and/or receive data from the client computing device 104 through a network 113. In some aspects, the network 113 is a distributed computing network, such as the internet. In further aspects, that CU system building platform 100 is implemented on more than one server computing device 105, such as a plurality or network of server computing devices 105. In some aspects, the CU system building platform 100 is a hybrid system with portions of the CU system building platform 100 on the client computing device 104 and with portions of the CU system building platform 100 on the server computing device 105.

In some aspects, the CU system building platform 100 communicates through a network 113 to a library 101. In other aspects, the CU system building platform 100 includes a library 101. The library 101 may include one or more repositories 135. Each repository 135 includes one or more prebuilt conversational items 130. Prebuilt conversational items 130 can be a task specific template 132 or a subtask module 134. In some aspects, a repository 135 includes both types of prebuilt conversational items 130. In other aspects, a repository 135 includes only one type of conversational item 130, such as task specific templates 132 making a task specific template repository 136. In additional aspects, a repository 135 includes only type of conversational item 130, such as subtask modules 134 making a subtask module repository 138. The one or more libraries 101 may be updated by the provider. These various components may be implemented using hardware, software, or a combination of hardware and software. In some aspects, a libraries 101 utilized the CU system building platform 100 is created utilizing the CU system building platform 100.

The prebuilt conversational item 130 is directed to a specific function. For example, task specific templates 132 are directed to performing a specific task, such as a restaurant reservation, flight reservation, hotel booking, cab booking, food delivery, order flowers and etc. This list is exemplary only and is not meant to be limiting. As known by a person of skill in the art any suitable task for a CU system may be utilized as a prebuilt conversational item 130. However, while the subtask modules 134 are directed to performing a specific function, this function is not task specific and could be utilized in the performance of several different tasks. The subtask modules 134 may include standard entities to be collected from the user, such as date/time, address, phone number, payment information, as well as, dialog operations, such as salutations, confirmation, disambiguation over a list, modification of already-provided data, and etc. This list is exemplary only and is not meant to be limiting. Any subtask module 134 as known by a person of skill in the art may be a prebuilt conventional item 130. For example, a flight reservation template (or task specific template 132) directed to the booking of airfare may include a payment module (or subtask module 134) to pay for the booked airfare. These different task specific templates 132 and subtask modules 134 are explained in more detail below.

The prebuilt conversational items 130 are considered prebuilt because each item 130 is preconfigured to include all of the necessary parameters, constraints, schema, schema information, bindings, rules, inheritance, hierarchy, structure, segments (example utterances or selections for user input), and model training necessary to create a CU system for the item's given function. For example, the prebuilt conversational items 130 form a CU system 100 with fully trained task specific or function specific ASR system 108, NLU system 110, DM system 112, and NLG system 114 upon implementation. Accordingly, each prebuilt conversational item 130 can be implemented to create a CU system 106 without requiring any further input from the builder 102.

The CU system building platform 100 includes a user interface for building a CU system 106. The user interface is generated by the CU system building platform 100 and presented to the builder 102 via the client computing device 104. The user interface of the CU system building platform 100 allows the builder 102 to select one or more prebuilt conversational items 130. The user interface provides the one or more prebuilt conversational items 130 to the builder 102 for selection. The user interface may provide and/or display the one or more prebuilt conversational items 130 to the builder 102 in any known suitable manner, such as in lists, icons, details, tiles, and/or contents. The CU system building platform 100 receives selections from a builder 102 via the user interface through a client computing device 104.

In some aspects, the user interface presents all known prebuilt conversational items 130 from the library 101 to the builder 102 for selection. In other aspects, the user interface presents only a portion of the known prebuilt conversational items 130 from the library 101 to the builder 102 for selection. In some aspects, the user interface includes a search function or a search interface. The search function may provide a search box to the builder 102 for allowing a builder 102 to input a search query. In response to a received builder search query, the search function may retrieve one or more prebuilt conversational items 130 based on the builder query and present these search results to the builder 102 for selection. In some aspects, the query consists of example user inputs 118 or system utterances, such as natural language inputs. In other aspects, the prebuilt conversational items 130 are divided into categories. In these aspects, the user interface presents a portion of the known prebuilt conversational items 130 from the library 101 to the builder 102 for selection based on a category selection by the builder 102. In some aspects, the categories include task-specific templates, subtask modules, travel, restaurant, shopping, and etc. This list of categories is exemplary and is not mean to be limiting. Any other suitable categories for prebuilt conversational items 130 as known by a person of skill in the art may be utilized by the CU system building platform 100. In other aspects, the CU system building platform 100 analyzes the list of selected conversational items 130 from the builder 102 to index and search for further relevant and/or related conversational items 130 to the builder 102. In these aspects, the CU system building platform 100 provides these relevant and/or related conversational items 130 to the builder 102 for selection on the user interface.

Each prebuilt conversational item 130 may include a descriptive label 206 that is presented on the user interface that informs the builder 102 of the function of the prebuilt conversational item 130. In some aspects, each prebuilt conversational item 130 also includes a description (one or more sentences) of the function that can be accessed upon selection or upon hovering over prebuilt conversation item 130 or hovering over a specific portion of the prebuilt conversational item 130. In further aspects, each category may include a descriptive label 206 that is presented on the user interface that informs the builder 102 of the types of functions of the prebuilt conversational items 130 that are included in that category. In some aspects, each category also includes a description of the types of functions of the prebuilt conversational items 130 that is included in that category that can be accessed upon selection or hovering over the category or hovering over a specific portion of the category.

The builder 102 may select one or more prebuilt conversational items 130 to build a CU system 106 with desired functionalities. The CU system building platform 100 receives the one or more user selections via the user interface. In response to receiving a first selection, the user interface of the CU system building platform 100 presents a specification of the selected conversational item 130 to the builder 102 and provides the builder 102 with one or more options. For example, the user interface may provide and/or present an implementation option, a simulation option, a customization option, and/or a further selection option (also referred to herein as a modification option) to the builder 102. Accordingly, the builder 102 may customize template or created specifications, select additional prebuilt conversational items 130 to modify the template or created specifications, test template or created specifications in a simulation, and/or implement the template or created specifications into a CU system 106.

Figure 6:
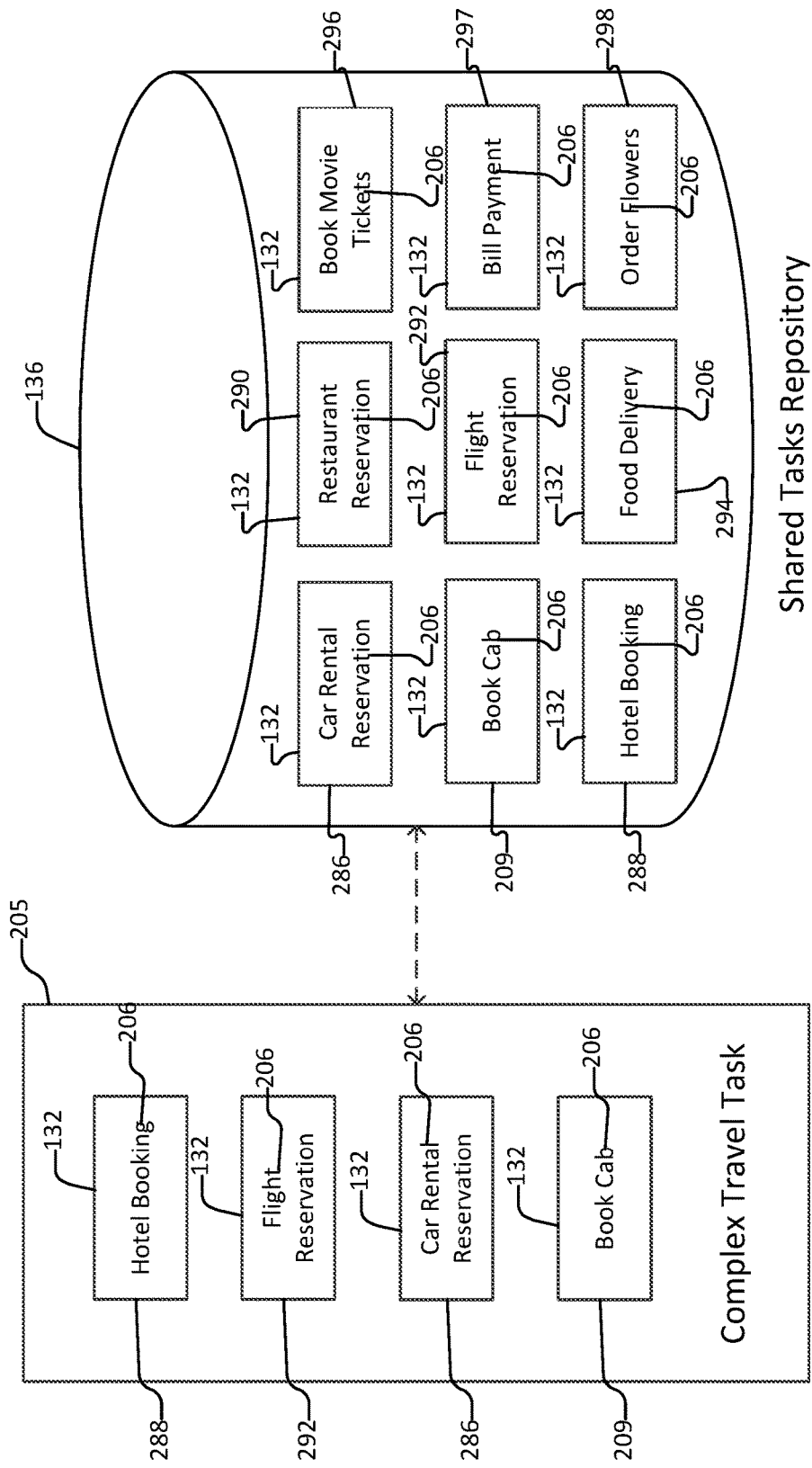
FIG. 6 is schematic diagram illustrating a complex task and a task specific template repository, in accordance with aspects of the disclosure.

In some aspects, the builder 102 selects a plurality of prebuilt conversational items 130 utilizing the user interface of the CU system building platform 100. The builder 102 may select any number of task specific templates 132 (e.g. a first task specific template, a second task specific template, ... n$^{th}$ task specific template) and/or any number of subtask modules 134 (e.g. a first subtask module, a second subtask module, ... n$^{th}$ subtask module) utilizing the user interface of the CU system building platform 100. For example, the builder 102 may select a first task specific template 132 and then select one or more subtask modules 134 to add to or to modify the specification of the selected first task specific template as illustrated in FIG. 4C. In other aspects, the builder 102 may select a plurality of task specific templates 132 to form a complex task 205 as illustrated in FIG. 6. In these aspects, the builder 102 may further select one or more additional subtask modules 134 to add to or to modify the various specifications of the complex task 205.

The one or more selected conversational items 130 selected by the builder 102 form a selected item set. The selected item set is ready for implementation without requiring any further input from the builder 102. For example, the one or more selected conversational items are automatically combined by the CU system building platform 100. Additionally, the builder 102 may customize the one or more selected conversational items in the selected item set. The combined, customized, and/or modified one or more selected conversational items form a conversational component.

The selected item set is automatically combined by integrating preconfigured inheritances and preconfigured structures between the various different selected conversational items. In some aspects, the selected item set is automatically combined by determining if any of the selected conversational items share any required information. If any common required information is determined by the CU system building platform 100, the common required information is linked for synchronized data population. In other words, if more than one of the selected conversational items require, name, address, payment information, and phone number, these preconfigured parameters 202 are linked so that once the user 103 of the CU system 106 provides this information, the information is populated in every place that requires this same information.

In further aspects, the selected item set is automatically combined by determining if any of the selected conversational items share any of the same subtask modules 134. If any common subtask modules 134 are determined by the CU system building platform 100, all but one of the common subtask modules 134 are removed. For example, if two different task specific templates 132 are combined, such as a flight reservation task specific template and a rental car reservation task specific template, each could contain its own payment subtask module. In this example, the extra payment subtask module is removed and payment for both task specific templates is requested at the same time. In alternative aspects, if any common subtask modules 134 are determined by the CU system building platform 100, the common subtask modules 134 are linked for synchronized data population.

As discussed above, in some aspects, a builder 102 may select two or more task specific templates 132 to form a complex task 205. In further aspects, the user interface of the CU system building platform 100 presents or provides the complex task 205 that lists all of the selected task specific templates by label 206 at high level. In these aspects, an option is presented to the builder 102 by the user interface to view the specifications of one or more of the selected task specific templates for further customizations and/or modifications. In response to receiving a builder selection, the user interface of the CU system building platform 100 provides and/or displays the specification 200 of the selected task specific templates for further customizations and/or modifications. In other aspects, an option is presented to the builder 102 by the user interface to view the automatically combined specifications of the selected task specific templates and/or selected subtask modules for further customizations and/or modifications. In response to receiving a builder selection of this option, the user interface of the CU system building platform 100 provides and/or displays the automatically combined specifications of the selected task specific templates and/or subtask modules for further customizations and/or modifications.

The specification 200 of a selected conversational item 130 includes one or more preconfigured parameters 202 and one or more preconfigured constraints 204. The preconfigured parameters 202 represent information the CU system 106 will recognize and collect for the CU system 106. The parameters 202 are preconfigured because the schema, entities, slots, and/or bindings necessary for these parameters 202 are provided by the task specific template 200. The preconfigured parameters 202 may be collected from user input 118, from information stored on the client computing device 104, and/or from information found though a network 113. The preconfigured constraints 204 are any form of validating the value of a parameter or combination of values of parameters. Validation includes grounding of the values. For example, the values may be grounded in a database such that the values become actionable. For instance, grounding a hotel name as a specific hotel in a travel agent's database allows queries about open rooms on particular nights to be made that relate to that particular hotel. Accordingly, in some aspects the preconfigured constraints 204 represent which preconfigured parameters 202 must be present or collected for the CU system 106 to perform the desired function and/or task of the selected prebuilt conversational item.

As discussed above, the builder 102 may customize one or more of the selected conversational items in the selected item set. In some aspects, the builder 102 selects any desired preconfigured parameter 202 and/or preconfigured constraint 204 as listed in a displayed specification 200 in the user interface to build a customized specification. In other aspects, the builder 102 removes any undesired preconfigured parameter 202 and/or preconfigured constraint 204 as listed in the displayed specification 200 on the user interface to build a customized specification. The CU system building platform 100 receives the builder selected customization via the user interface. In response to a received customization from a builder 102, the CU system building platform 100 creates a customized specification by removing and/or adding the preconfigured parameter 202 and/or a preconfigured constraint 204 as selected by the builder 102. The preconfigured parameters 202 and/or preconfigured constraints 204 are provided by the specifications 200 of a task specific template 132 or a subtask module 134.

In further, aspects the builder 102 may build a non-preconfigured parameter and/or a non-preconfigured constraint from scratch and add the non-preconfigured parameter and/or the non-preconfigured constraint to the specification 200 of a selected conversational item using the user interface of the CU system building platform 100 to customize a conversational item. The non-preconfigured parameter and/or the non-preconfigured constraint are not prebuilt. As such, the builder 102 must provide a schema, entities, slots, bindings, inheritance, and/or structure necessary for a CU system 106 to recognize and/or collect the non-preconfigured parameters as builder input to the CU system building platform 100. The CU system building platform 100 receives the created or built non-preconfigured parameter and/or the non-preconfigured constraint from the builder 102 as input via the user interface. In response receiving the non-preconfigured parameter and/or the non-preconfigured constraint, the CU system building platform 100 adds the non-preconfigured parameter and/or the non-preconfigured constraint to the specification 200 to form a customized specification.

In some aspects, the customization options include a parameter order option and/or a conversational item order option. In these aspects, the user interface provides and/or displays the parameter order option and/or the conversational item order option to the builder 102. The builder 102 may select the parameter order option and input a desired order of collection for listed preconfigured parameters 202 via the user interface. In response to receiving a parameter order from a builder 102, the CU system building platform 100 adds this desired order to the specification 200 as selected. The builder 102 may select the conversational item order option and input a desired order for running the selected conversational items via the user interface. In response to receiving a conversational item order from a builder 102, the CU system building platform 100 adds this desired order to the specifications 200 of the selected conversational items. While the builder 102 may select a desired order for configured parameters 202 and/or conversational items 130, after implementation the CU system 106 may stray from this order based on received user inputs as needed to perform the desired function.

Figure 4A:
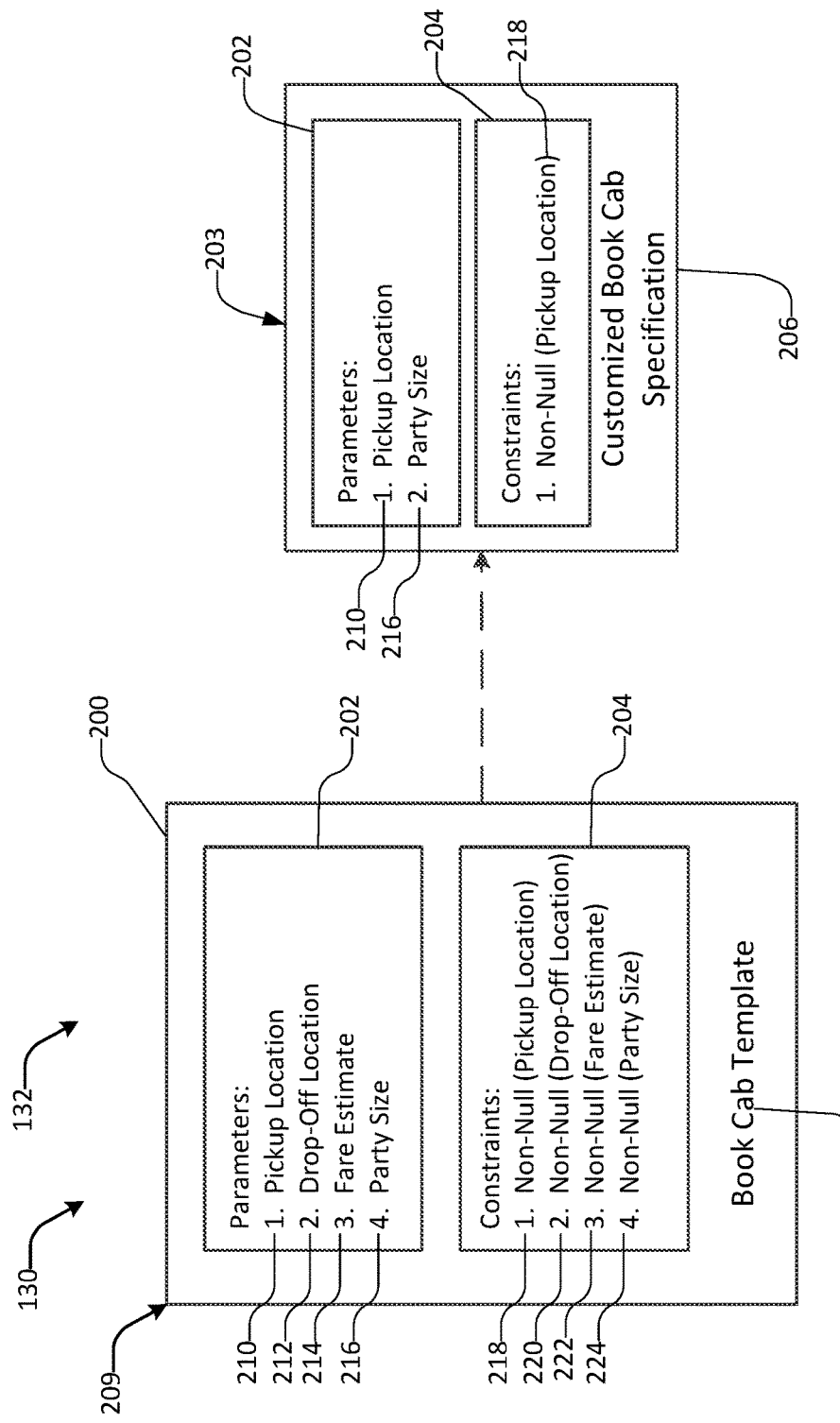
FIG. 4A is schematic diagram illustrating a specification of a selected task-specific template and builder customization of the selected task specific template for a conversational understanding system building platform, in accordance with aspects of the disclosure.
Figure 4B:
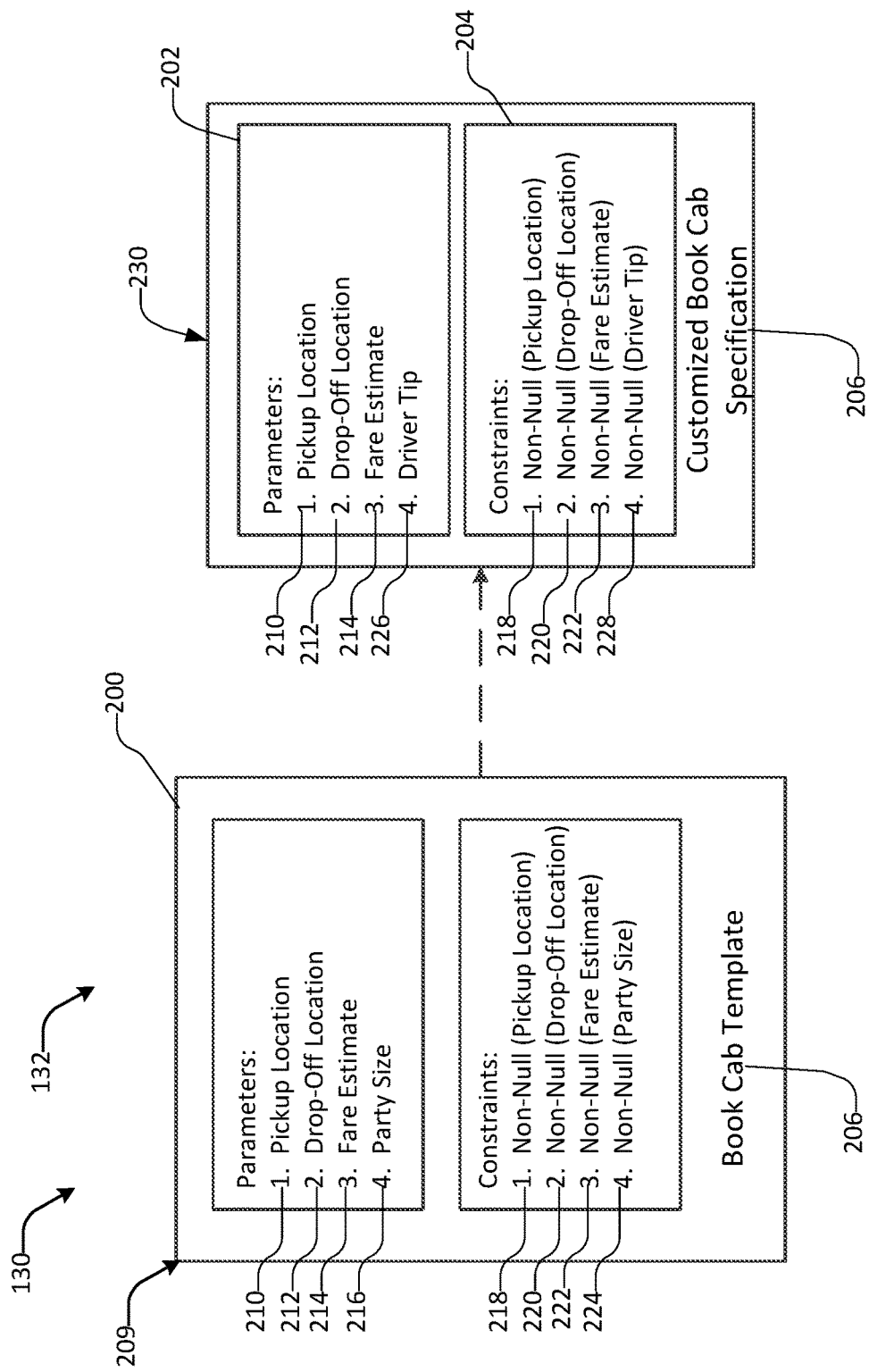
FIG. 4B is schematic diagram illustrating the specification of the selected task specific template as shown in FIG. 4A and builder customization of the selected task specific template for a conversational understanding system building platform, in accordance with aspects of the disclosure.
Figure 4C:
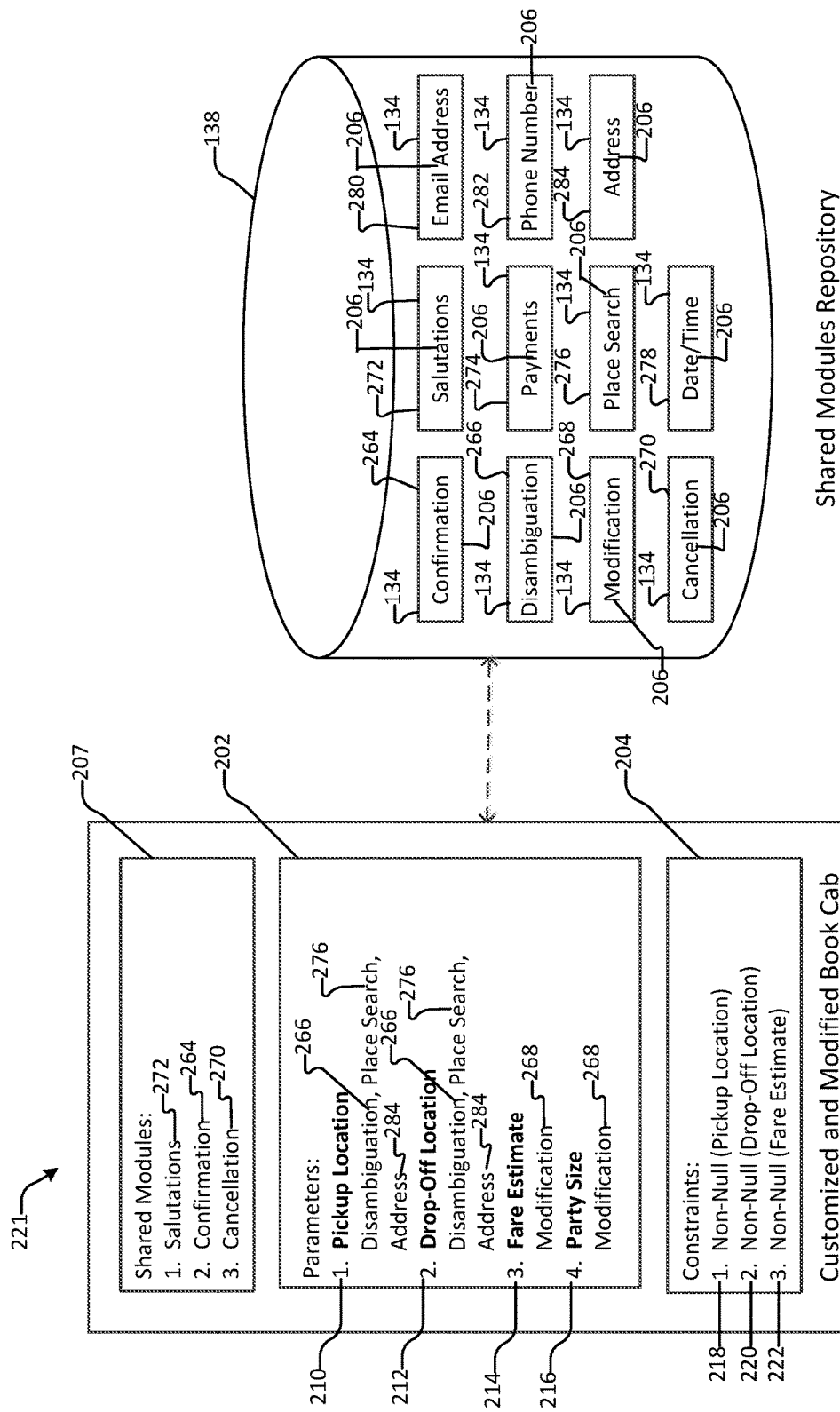
FIG. 4C is schematic diagram illustrating the specification of the selected task specific template as shown in FIG. 4A showing subtask modules after builder modification and customization and a subtask module repository for a conversational understanding system building platform, in accordance with aspects of the disclosure.

For example, FIGS. 4A, 4B, and 4C illustrate a specification 200 of a selected task specific template 132 and builder customization and/or modification of the selected task specific template 134 for a CU system building platform 100. In these examples, the builder 102 selected a task specific template 132 with a "book cab" functionality. Accordingly, the book cab template 209 includes "book cab" label 206. As illustrated in FIGS. 4A and 4B, the specification 200 of the book cab template 209 includes four different preconfigured parameters 202 and four different preconfigured constraints 204 for booking a cab. In these examples, the preconfigured parameters 202 include pickup location 210, drop-off location 212, fare estimate 214, and party size 216. The schema, entities, slots, bindings, inheritance, and/or structure for these parameters 202 are preconfigured and provided by the book cab template 209 without requiring any further input from the builder 102. The preconfigured constraints 204 represent which preconfigured parameters 202 must be present for the CU system 106 to perform the desired function or task of booking a cab. In these examples, the preconfigured constraints 204 include that the pickup location is required 218, the drop-off location is required 220, the fare estimate is required 222, and the party size is required 224. In some aspects, a task specific template 200 will require any listed preconfigured parameter 202. In other aspects, a task specific template 200 will require only a portion of the listed preconfigured parameters 202.

The CU system building platform 100 provides the specification 200 for the book cab template 209 in response to receiving a builder selection of the book cab template 209. As illustrated in FIGS. 4A and 4B, the builder 102 may customize the book cab template 209 to form customized book cab specification (203 or 230). For example, as illustrated in FIG. 4A, the builder 102 selected to remove the drop-off location parameter 212, the fare estimation parameter 214, and all of the preconfigured constraints 204 except for requiring the pickup location 218 to form a customized book cab specification 203. In another example, as illustrated in FIG. 4B, the builder 102 selected to remove the party size parameter 216, the constraint of requiring a party size 224 and added a non-preconfigured parameter of driver tip 226 and a constraint of requiring of requiring a driver tip 228 to form a customized book cab specification 230. While FIGS. 4A and 4B show builder customization of the book cab template 209, no input is required from the builder 102 for use of the book cab template 209. For example, the builder 102 may implement the book cab template 209 into a CU system 106 utilizing the CU system building platform 100 directly after selection of the book cab template 209 without requiring any further input from the builder 102.

Figure 5A:
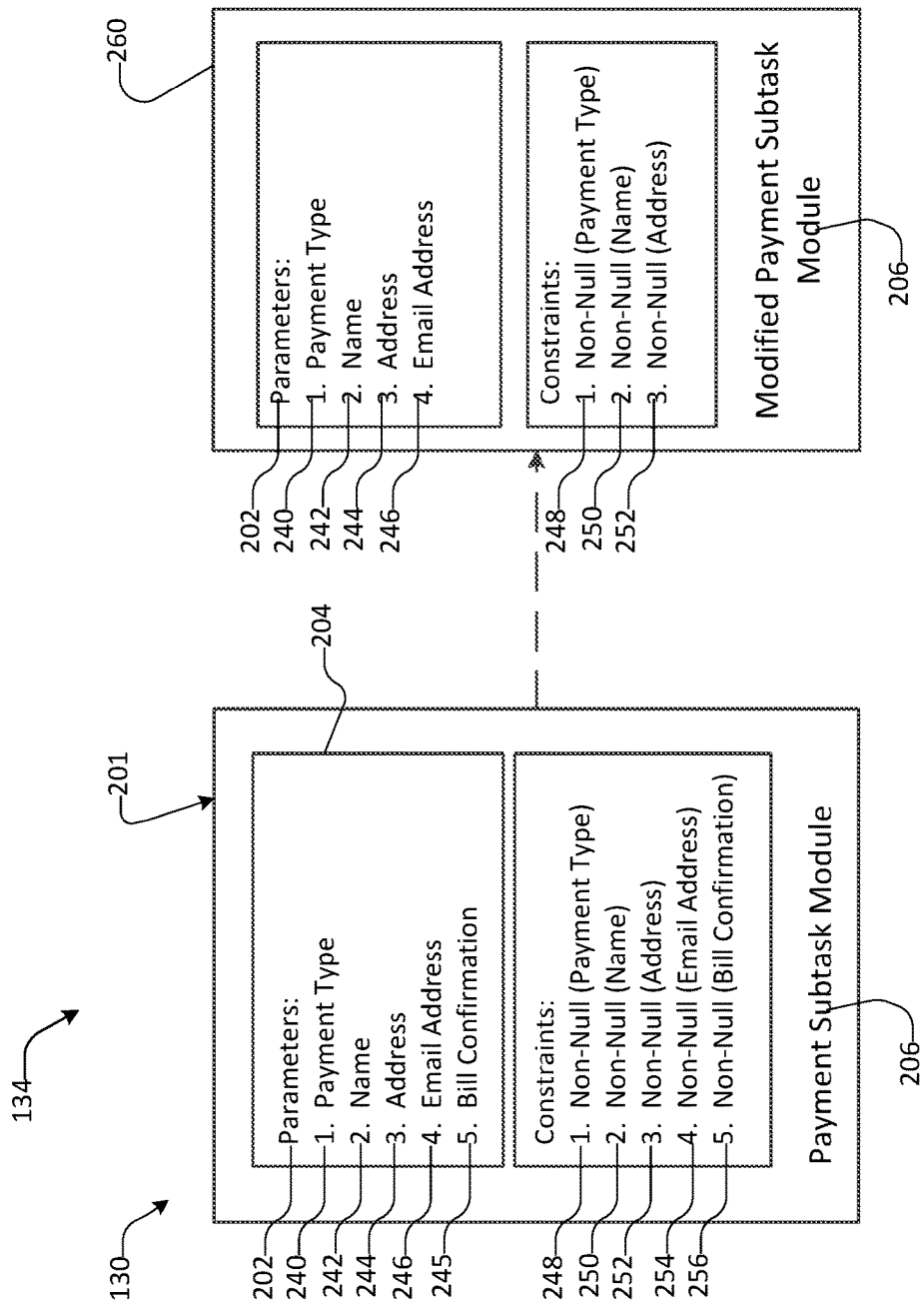
FIG. 5A is schematic diagram illustrating a specification of a selected subtask module and builder customization of the selected subtask module for a conversational understanding system building platform, in accordance with aspects of the disclosure.
Figure 5B:
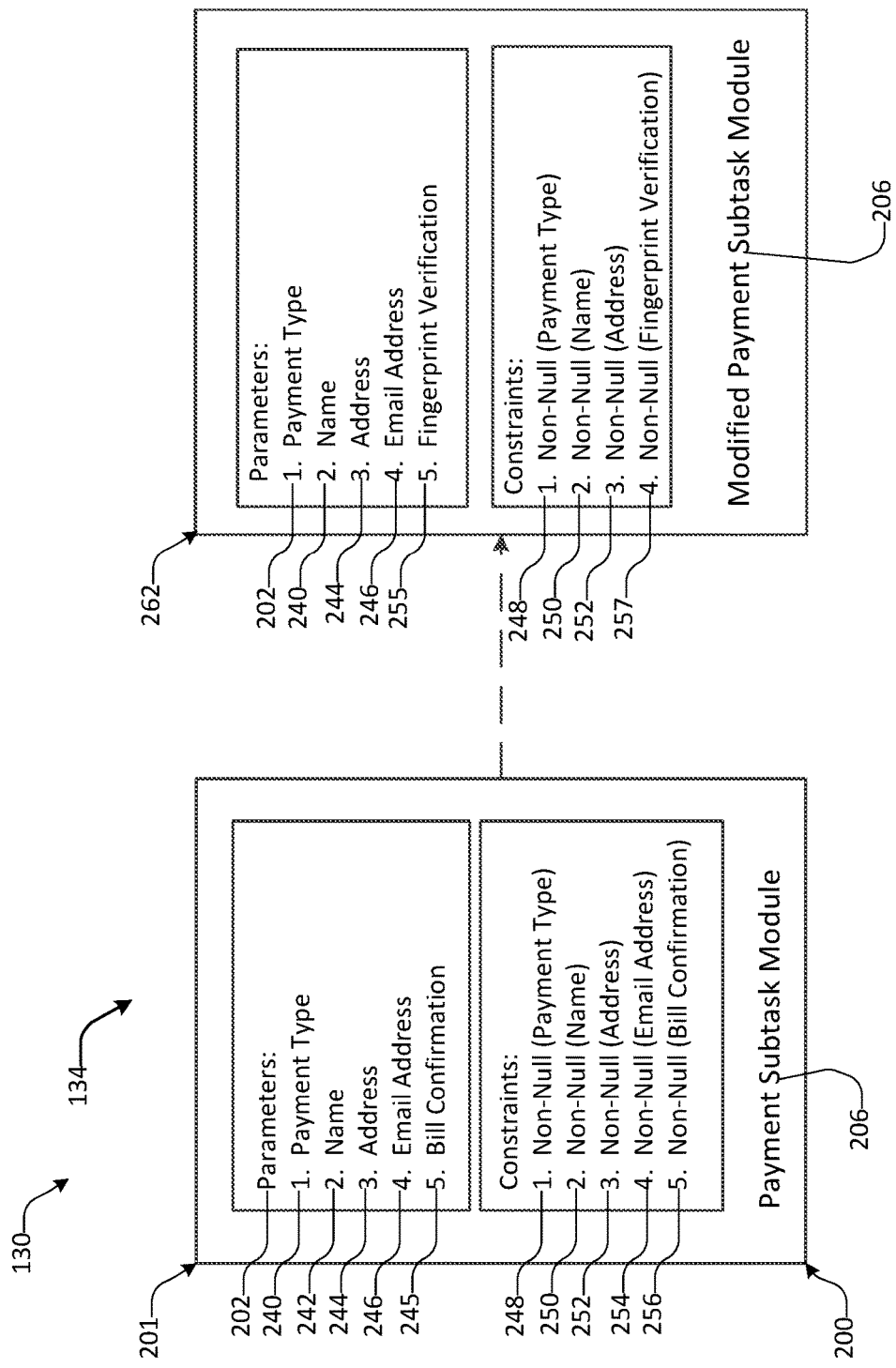
FIG. 5B is schematic diagram illustrating the specification of the selected subtask module as shown in FIG. 5A and builder customization of the selected subtask module for a CU system building platform, in accordance with aspects of the disclosure.

In some aspects, the CU system building platform 100 displays the specification 200 for a subtask module 134 in response to receiving a builder selection of that subtask module 134. As illustrated in FIGS. 5A and 5B, CU system building platform 100 displays the specification 200 for a payments subtask module 201 in response to receiving a builder selection of that payments subtask module 201. In this example, the payments subtask module 201 includes the following preconfigured parameters 202: 1) payment type 240; 2) name 242; 3) address 244; 4) email address 246; and 5) bill confirmation 245. Further in this example, the payments subtask module 201 includes the following preconfigured constraints 204: 1) requiring payment type 248; 2) requiring a name 250; 3) requiring an address 252; 4) requiring an email address 254; and 5) requiring bill confirmation 256. As further illustrated in FIGS. 5A and 5B, the builder 102 may customize payments subtask module 201 to form a customized payments subtask specification (260 or 262). For example, as illustrated in FIG. 5A, the builder 102 selected to remove the bill confirmation parameter 245 and the requiring bill confirmation constraint 256 to form a customized payments subtask specification 260. In another example, as illustrated in FIG. 5B, the builder 102 selected to remove the bill confirmation parameter 245, and the bill confirmation constraint 256, and added a non-preconfigured parameter of fingertip verification 255 and a constraint of requiring of fingertip verification 257 to form a customized payments subtask specification 262. While FIGS. 5A and 5B show builder customization of the payments subtask module 201, no input is required from the builder 102 for use of the payments subtask module 201. For example, the builder 102 may implement the payments subtask module 201 into a CU system 106 utilizing the CU system building platform 100 directly after selection of the payment subtask module 201 without requiring any further input from the builder 102.

In some aspects, a specification 200 of a task specific template 132 may display any utilized subtask modules 134. A builder 102 may add or remove subtask modules 134 to form a modified specification. The CU system building platform 100 receives builder selections via the user interface for adding and/or deleting subtask modules 134 from a task specific specification 200. In response to these selections, the CU system building platform 100 removes and/or adds subtask modules 134 to the specification 200 of a task specific template 132 to form a modified specification. In some aspects, the builder 102 selects a plurality of subtask modules 134 to form or create a unique task specific template.

For example, FIG. 4C illustrates a customized and modified book cab specification 221 and a subtask module repository 138 for a CU system building platform 100. In this example, the builder 102 removed the party size constraint 224 from a book cab template 209 to customize the specification 200. Further in this example, the builder 102 selected to add additional subtask modules 134 to the book cab template 209 to modify the specification 200 of the book cab template 209. As such, FIG. 4C illustrates a customized and modified book cab specification 221.

In this example, the customized and modified book cab specification 221 displays the subtask modules 134 for different preconfigured parameters 202 and for the overall task specific specification 200. For instance, the subtask modules 134 that apply to every parameter or that are shared by each parameter are listed in a shared module box 207. Subtask modules 134 that differ between preconfigured parameters 202 are listed separately under each preconfigured parameter 202. For instance, the pickup location parameter 210 and the drop-off location parameter 212 each utilize a disambiguation subtask module 266, a place search subtask module 276, and an address subtask module 284. Further, both the fare estimation parameter 214 and the party size parameter 216 each utilize a modification subtask module 268.

The book cab template 209 did not include a salutations subtask module 272 or a place search subtask module 276. The builder 102 selected to add the salutations subtask module 272 from a subtask module repository 138 via the user interface of the CU system building platform 100 and selected that this subtask module 134 be applied across all of the preconfigured parameters 202 in the book cab template 209. Additionally, in the example illustrated in FIG. 4C, the builder 102 selected to add a place search subtask module 276 from a subtask module repository 138 via the user interface of the CU system building platform 100 to the pickup location parameter 210 and to the drop-off location parameter 212. Accordingly, the CU system building platform 100 added the salutations subtask module 272 to the shared module box 207 and added the place search subtask module 276 to the pickup location parameter 210 and to the drop-off location parameter 212 in response to receiving the builder selection to form a modified book cab specification 221.

In this example, the builder 102 selected subtask modules from a subtask module repository 138. In this example, the subtask module repository 138 includes the following subtask modules 134: 1) confirmation 264; 2) disambiguation 266; 3) modification 268; 4) cancellation 270; 5) salutations 272; 6) payments 274; 7) place search 276; 8) date/time 278; 9) email address 280; 10) phone number 282; and 11) address 284. The confirmation subtask module 264 may have a function of requiring a user to confirm that they are ready to perform the action of the task. The disambiguation subtask module 266 may have a function of determining whether the user is referring to prior turns in a dialog, to content displayed on the client device, or a specific item in a list. The modification subtask module 268 may have a function of allowing a user to go back and modify previously provided input before executing the task. The cancelation subtask module 270 may have a function of allowing a user to cancel at any time during the dialog before performing the task. The salutations subtask module 272 may have a function of greeting the user at the beginning of dialog, such as with "hi," "good morning," "howdy," and etc. and/or saying good bye at the end of a dialog, such as "goodbye," "have a good day," and etc. The payments subtask module 274 may have a function of getting payment information and payment for any purchased items and/or services. The place search subtask module 276 may have a function of resolving names into one or multiple matching items along with (for example) street address, contact info, latitude or longitude coordinates, categorization of type of business, services provided, owner's description, ratings and reviews, related URLs and other web resources. The date/time subtask module 278 may have a function of requiring that a date and a time are established for a given parameter and/or task. The email address subtask module 280 may have a function of requiring an email address for a given parameter and/or task. The phone number subtask module 281 may have a function of requiring a phone number for a given parameter and/or task. The address subtask module 284 may have a function of requiring a physical address for a given parameter and/or task. The above list of subtask modules 134 is exemplary only and is not meant to be limiting.

FIG. 6 illustrates a complex task 205 and a task specific template repository 136. In this example, the builder 102 is building a CU system for a travel application. As such, the builder 102 selects various different task specific templates 132 that relate to different travel functions from a task specific template repository 136. For instance, the complex travel task 208 as created by the builder 102 includes a hotel booking task specific template 288, a flight reservation task specific template 292, a car rental task specific template 286, and book cab template 209. In this example, the task specific template repository 136 includes various different task specific templates 132, such as a hotel booking task specific template 288, a flight reservation task specific template 292, a car rental task specific template 286, book cab template 209, restaurant reservation task specific template 290, food delivery task specific template 294, book movie tickets task specific template 296, bill payment task specific template 297, and order flowers task specific template 298. This list of tasks specific templates is exemplary only and is not meant to be limiting.

The simulation option, as discussed above, allows the builder 102 to simulate a CU system for the conversational component. Accordingly, the CU system building platform 100 allows the builder 102 to test the conversational component before implementation. The user interface of the CU system building platform 100 presents or provides the simulation option to the builder 102. In response to receiving a builder selection of the simulation option, the CU system building platform 100 simulates a CU system for the conversational component. After the simulation, the user interface of the CU system provides and/or presents the builder 102 with all of the various options again, as discussed above. For example, the user interface may provide and/or present an implementation option, a simulation option, a customization option, and/or a modification option to the builder 102.

The implementation option, implements the conversational component. The user interface of the CU system building platform 100 presents or provides the implementation option to the builder 102. In response to receiving a builder selection of the implementation option, the CU system building platform 100 forms or implements a CU system 106 based on the conversational component or the selected item set and provides the created CU system 100 to the builder 102. The builder 102 may then add the created CU system 106 to any desired digital agent, bot, messaging application, voice agent, or any other application type.

The use of any built CU system in connection to any of the list applications (e.g. Bot, messenger service, etc.) created in the CU system building platform 100 will generate logs of conversations with real users. In some aspects, these logs can be inspected and analyzed by the builder. Based on the analysis of these logs, the builder may utilize the CU system building platform 100 again to add, remove, and/or customize the builder's previously built CU system in order to improve and/or address any observed issues in this implemented CU system.

Figure 7:
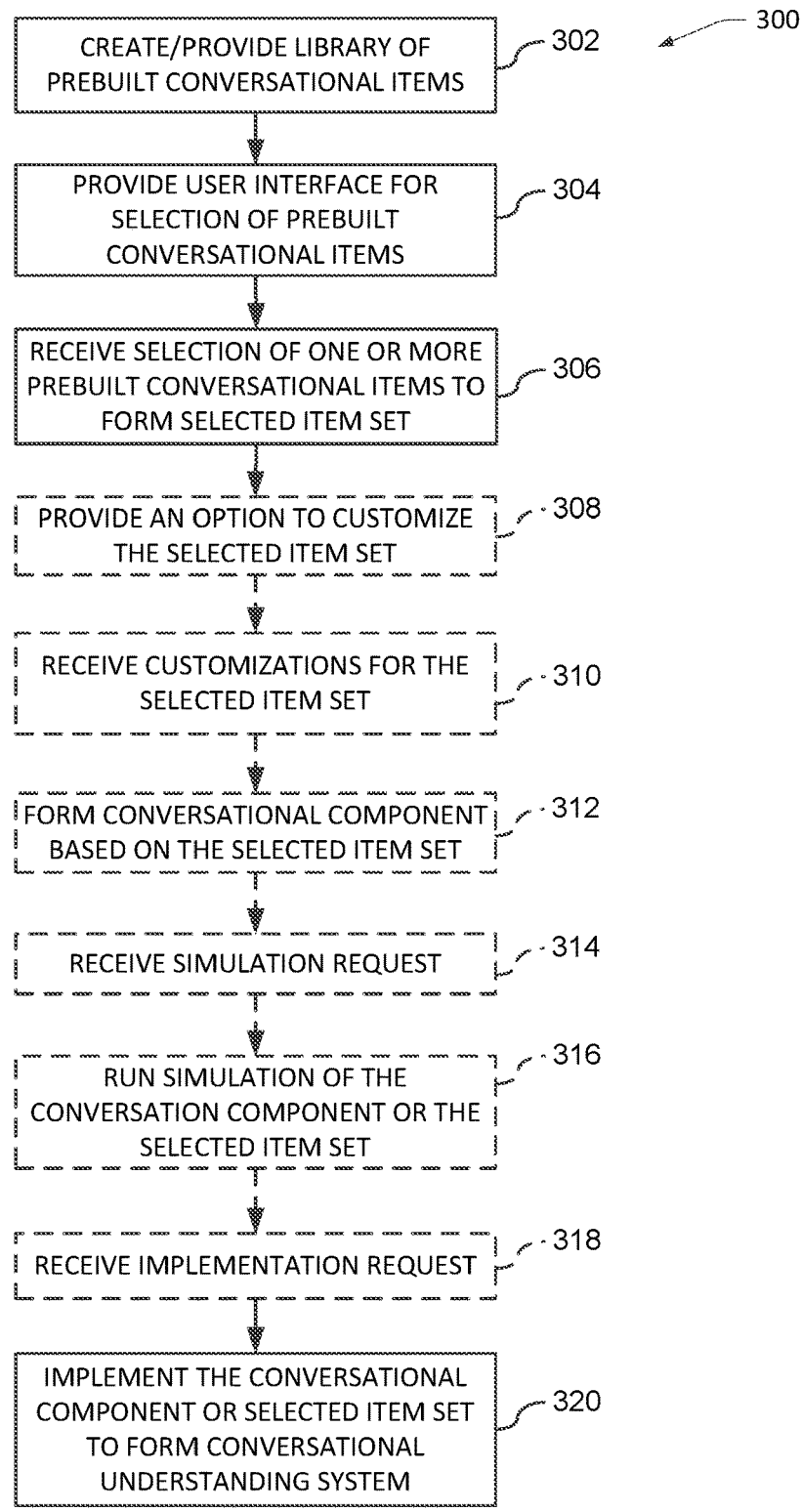
FIG. 7 is a flow diagram illustrating a method for building a conversational understanding system, in accordance with aspects of the disclosure.

FIG. 7 illustrates a flow diagram conceptually illustrating an example of a method 300 for building a CU system. In some aspects, method 300 is performed by the CU system building platform 100 as described above. Method 300 provides prebuilt conversational items that can form a CU system 106 upon selection by a builder without requiring any further input from the builder. As such, method 300 provides a method for building a CU system that is easier to use and requires less expertise, less time and fewer resources than required by previously utilized methods for building a CU system.

At operation 302, a library of prebuilt conversational items is accessed. In some aspects, the library of prebuilt conversational items is created during method 300. In other aspects, the library of prebuilt conversational items was previously created and is just provided to a builder. A conversational item is a task specific template or a subtask module. As such, the library includes one or more task specific templates and/or one or more subtask modules. A prebuilt conversational item includes one or more preconfigured parameters, one or more preconfigured constraints, a preconfigured inheritance, and/or a preconfigured structure.

At operation 304 a user interface is provided and/or presented for selecting one or more prebuilt conversational items from the library. A builder may utilize the presented and/or provided user interface to select one or more prebuilt conversational items from the library. The user interface is presented and/or provided to a builder via a client computing device.

At operation 306 a selection of at least one prebuilt conversational item is received to form a selected item set. The selection is received based on builder input entered into the user interface. In these aspects, the client computing device may receive selections via a key pad, touch screen, or any suitable type of input system on the client computing device. Accordingly, the builder selection is received directly from the builder or from a client computing device. In some aspects, the selected item set is capable of implementation upon selection without requiring any further input from the builder.

In some aspects, method 300 includes operations 308 and 310. While the selected item set is capable of implementation without further builder input, an option to customize and/or modify the selected item set is provided at operation 308. At operation 308 the selected item set may be customized by allowing the builder to select desired preconfigured parameters and/or preconfigured constraints. In an alternative aspect, the selected item set may be customized by allowing the builder to remove any undesired preconfigured parameters and/or preconfigured constraints from one or more conversational item specifications of the selected item set. In further aspects, at operation 308, the selected item set may be customized by allowing the builder to build and add a non-preconfigured parameter and/or a non-preconfigured constraint to one or more conversational item specifications of the selected item set. In additional aspects, at operation 308 the selected item set may be customized by allowing the builder order how the preconfigured parameters in one or more conversational item specifications of the selected item set are retrieved by a formed CU system.

At operation 308 the selected item set may be modified by allowing the builder to select additional conversational items. In an alternative aspect, the selected item set may be modified by allowing the builder to remove any undesired conversational items. In further aspects, at operation 308, the selected item set may be modified by allowing the builder to build and add a non-prebuilt conversational item to the selected item set. In additional aspects, at operation 308 the selected item set may be customized by allowing the builder order how the conversational items are retrieved by a formed CU system.

At operation 310, customizations and/or modifications are received from a builder via the user interface for the selected item set. At operation 310, the customizations and/or modifications are added to the complex task or to the desired specification in response to the received customizations and/or modifications.

Figure 8:
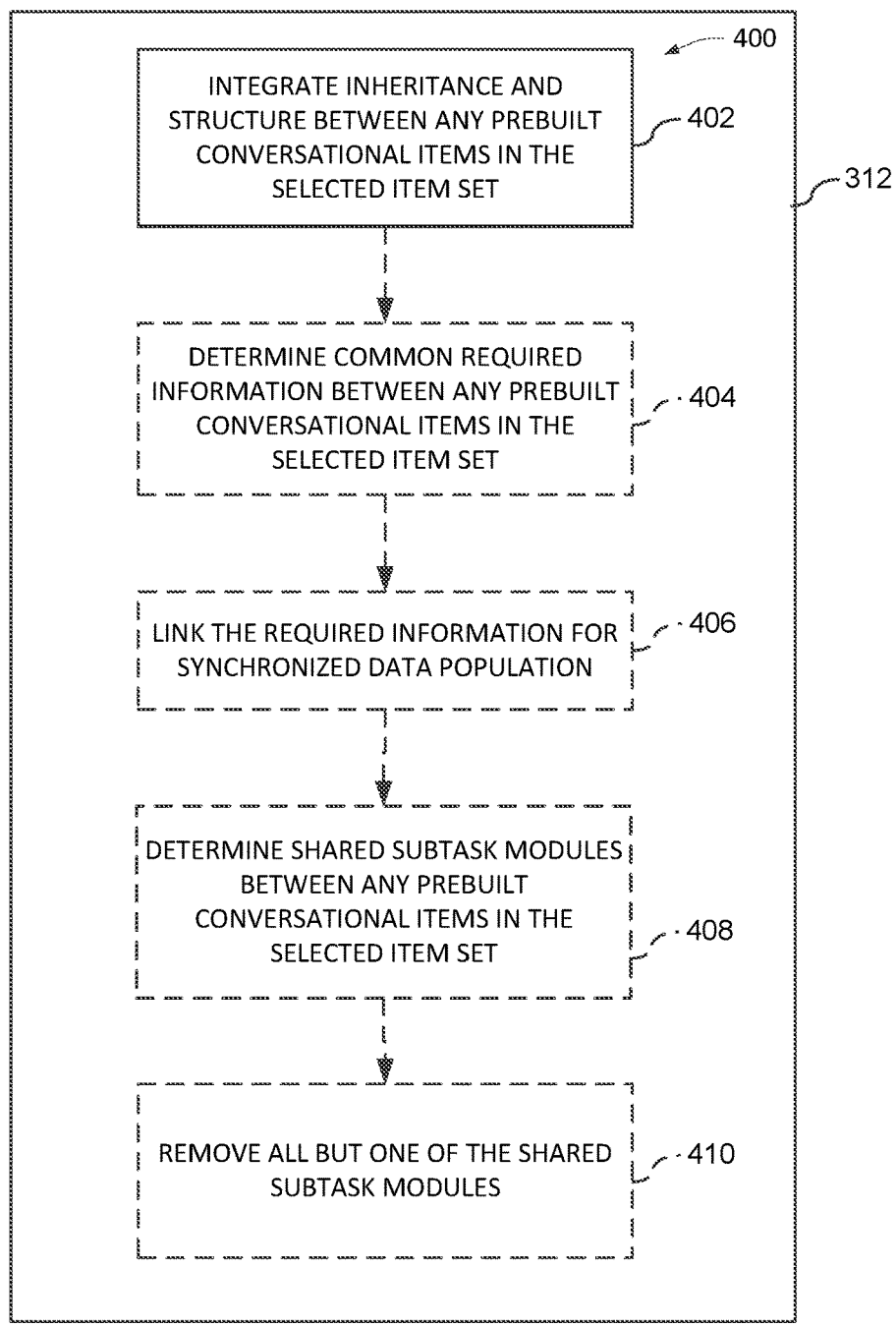
FIG. 8 is a flow diagram illustrating a method for forming a conversational component, in accordance with aspects of the disclosure.

In further aspects, method 300 includes operation 312. At operation 312 a conversational component is formed based on the selected item set. The conversational component is capable of being formed and implemented without requiring any input from the builder at operation 312. FIG. 8 illustrates a method 400 for forming a conversational component at operation 312. For example, if more than one conversational item is in the selected item set, the various different selected conversational items may be automatically combined during operation 312 by integrating preconfigured inheritances and preconfigured structures between the various different selected conversational items at operation 402. In further aspects, the automatic combination of the various different selected conversational items of operation 312 also comprises determining if any common required information exists between the various different selected conversational items at operation 404. If so, the common required information is linked for synchronized data population during operation 406. In other words, if a user's name and address are require by multiple different conversational items, this information is linked so that once the user's name and address are obtained by an implemented CU system, this information is automatically populated in all the places that require this same information. In additional aspects, the automatic combination of the various different selected conversational items during operation 312 also comprises determining if any subtasks modules are shared between the various different selected conversational items at operation 408. In some aspects, if any common or shared subtask modules are determined during operation 408, all but one of the shared or common subtask modules are removed from the selected item set at operation 410. In alternative aspects, if any common subtask modules 134 are determined during operation 408, the common subtask modules 134 are linked for synchronized data population at operation 410.

While the conversational component is capable of being formed and implemented without requiring any input from the builder at operation 312, builder selected customizations and/or modifications are received, the conversational component formed at operation 312 may be based on the received customizations and/or modification in addition to the automatic combination of the various different conversational items.

In some aspects, method 300 includes operation 314 and operation 316. A simulation request is received at operation 314. The simulation request may be received via a user interface from a builder. The user interface may provide and/or display a simulation option to a builder. At operation 316 a simulation of the conversational component or of the selected item set is run in response to receiving the simulation request. The simulation allows a builder 102 to simulate or test how a currently built conversational component or selected item set would behave if implemented into a CU system. For example, a simulation at operation 316 could consist of using a set of utterances provided by the builder or could consist of automatically generated simulated-user utterances and system responses to test an implemented conversational component or selected item set. While operations 314 and 316 are listed in a specific spot in method 300 and only listed once, method 300 may perform operation 314 and 316 as many times as desired and at any point after operation 306 but before operation 320. For example, if the builder is unhappy with a simulation, the builder may want customize or modify the conversational component. As such, after performing operation 316, operations 308 and 310 may be performed again.

In further aspects, method 300 includes operation 318. An implementation request is received at operation 318. The implementation request may be received via a user interface from a builder. The user interface may provide and/or display an implementation simulation option to a builder.

At operation 320 the conversational component or the selected item set is implemented to form a CU system. In some aspects, the conversational component or the selected item set is implemented in response to receiving an implementation request at operation 318. In other aspects, the conversational component or the selected item set is implemented automatically upon formation. The created CU system is provided to the builder. The builder may then add the created CU system to any desired digital agent, bot, messaging application, voice agent, and/or any other application type.

The use of any built CU system in connection to any of the list applications (e.g. Bot, messenger service, etc.) by method 300 will generate logs of conversations with real users. In some aspects, these logs can be inspected and analyzed by the builder. Based on the analysis of these logs, the builder may utilize method 300 again to add, remove, and/or customize the builder's previously built CU system in order to improve and/or address any observed issues in this implemented CU system.

FIGS. 9-12 and the associated descriptions provide a discussion of a variety of operating environments in which aspects of the disclosure may be practiced. However, the devices and systems illustrated and discussed with respect to FIGS. 9-12 are for purposes of example and illustration and are not limiting of a vast number of computing device configurations that may be utilized for practicing aspects of the disclosure, described herein.

Figure 9:
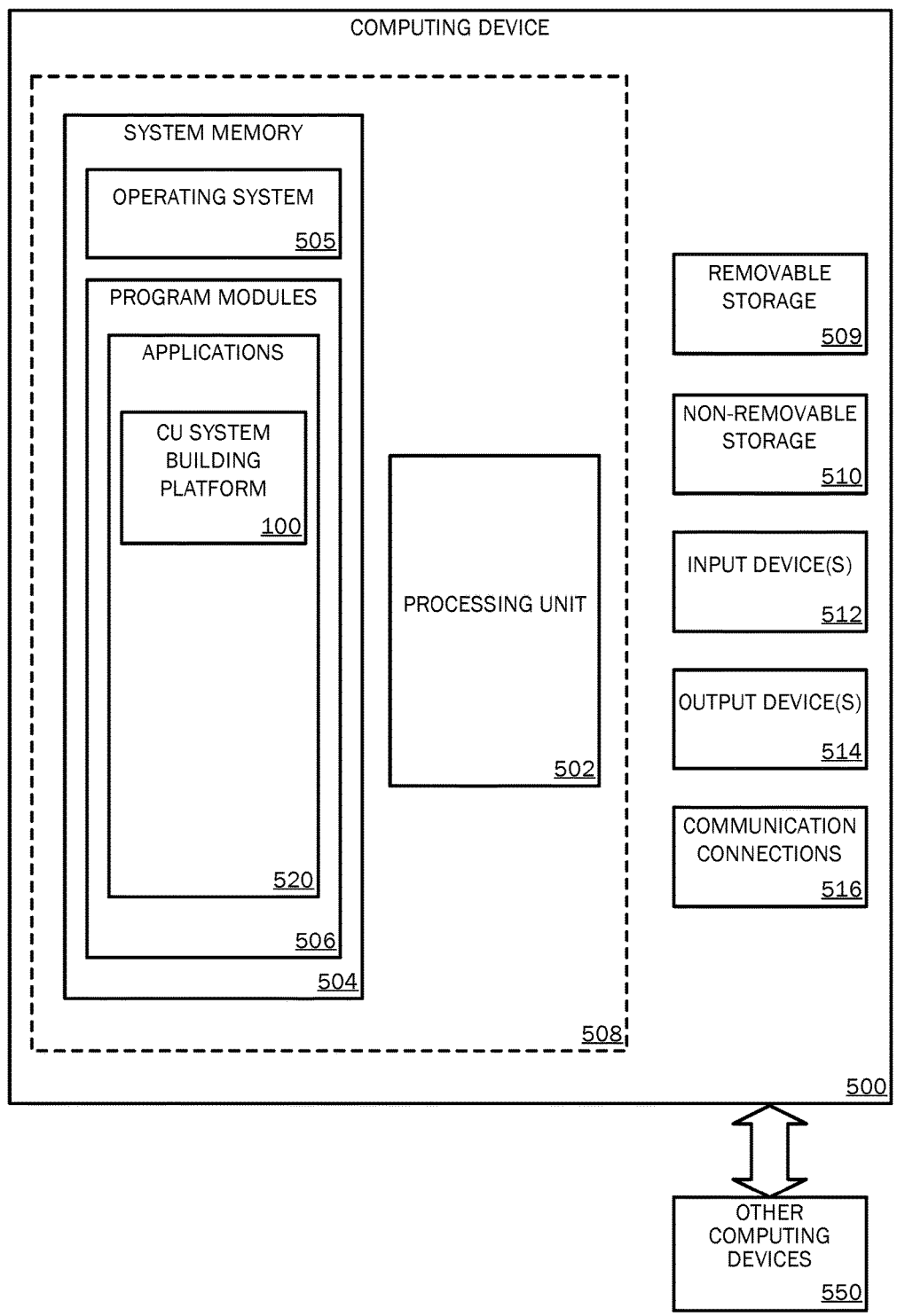
FIG. 9 is a block diagram illustrating example physical components of a computing device with which various aspects of the disclosure may be practiced.

FIG. 9 is a block diagram illustrating physical components (e.g., hardware) of a computing device 500 with which aspects of the disclosure may be practiced. For example, the CU system building platform 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the CU system building platform 100 that can be executed to employ method 300 to create a CU system 106 disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 9 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 9 by a removable storage device 509 and a non-removable storage device 510. For example, prebuilt conversational items 130 and/or the library 101 of the CU system building platform 100 could be stored on any of the illustrated storage devices.

As stated above, a number of program modules and data files may be stored in the system memory 504. While executing on the processing unit 502, the program modules 506 (e.g., the CU system building platform 100) may perform processes including, but not limited to, performing method 300 and/or method 400 as described herein. For example, the processing unit 502 may implement the CU system building platform 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the CU system building platform 100 allows a builder to build a CU system for one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
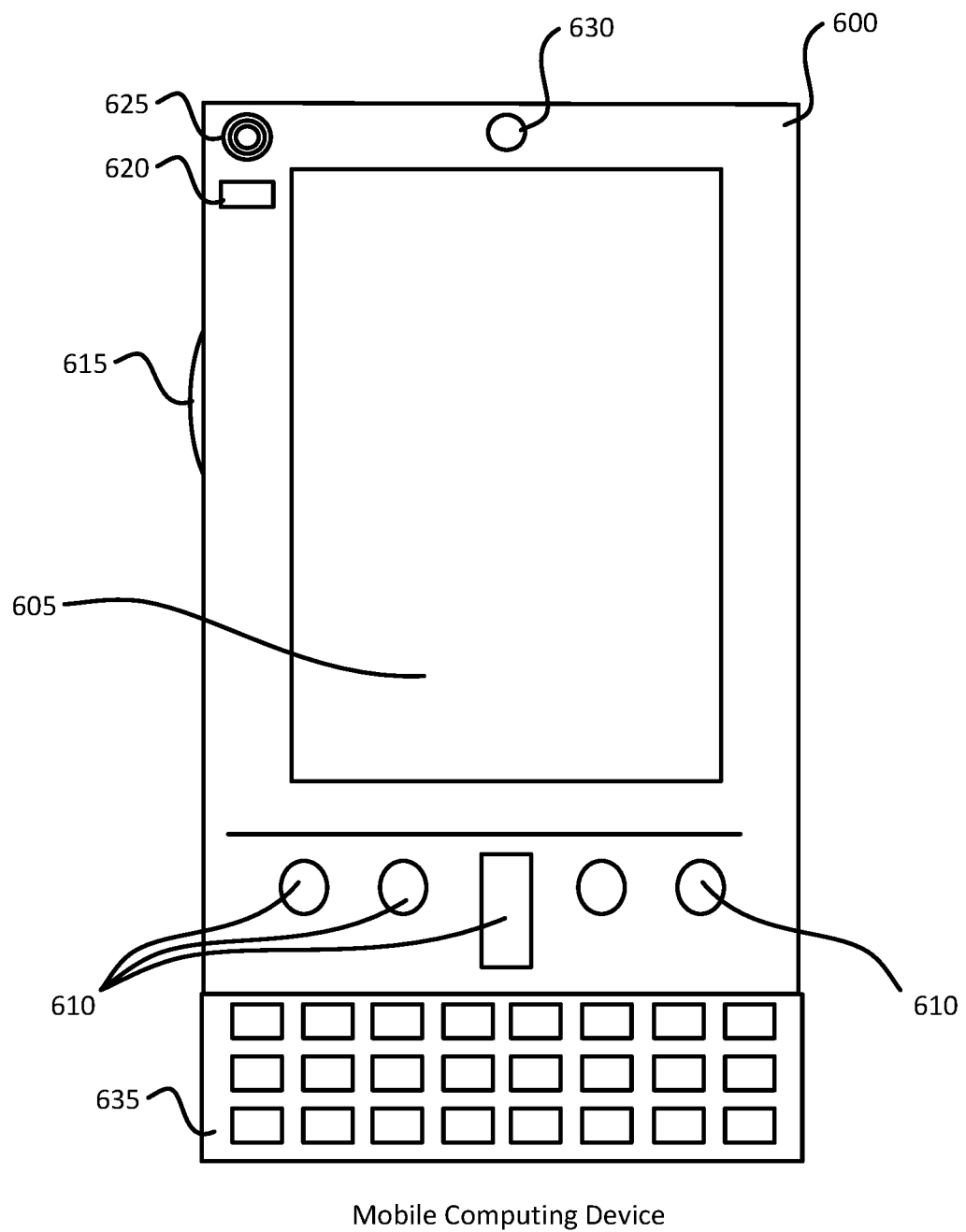
FIG. 10A is a simplified block diagram of a mobile computing device with which various aspects of the disclosure may be practiced.
Figure 10B:
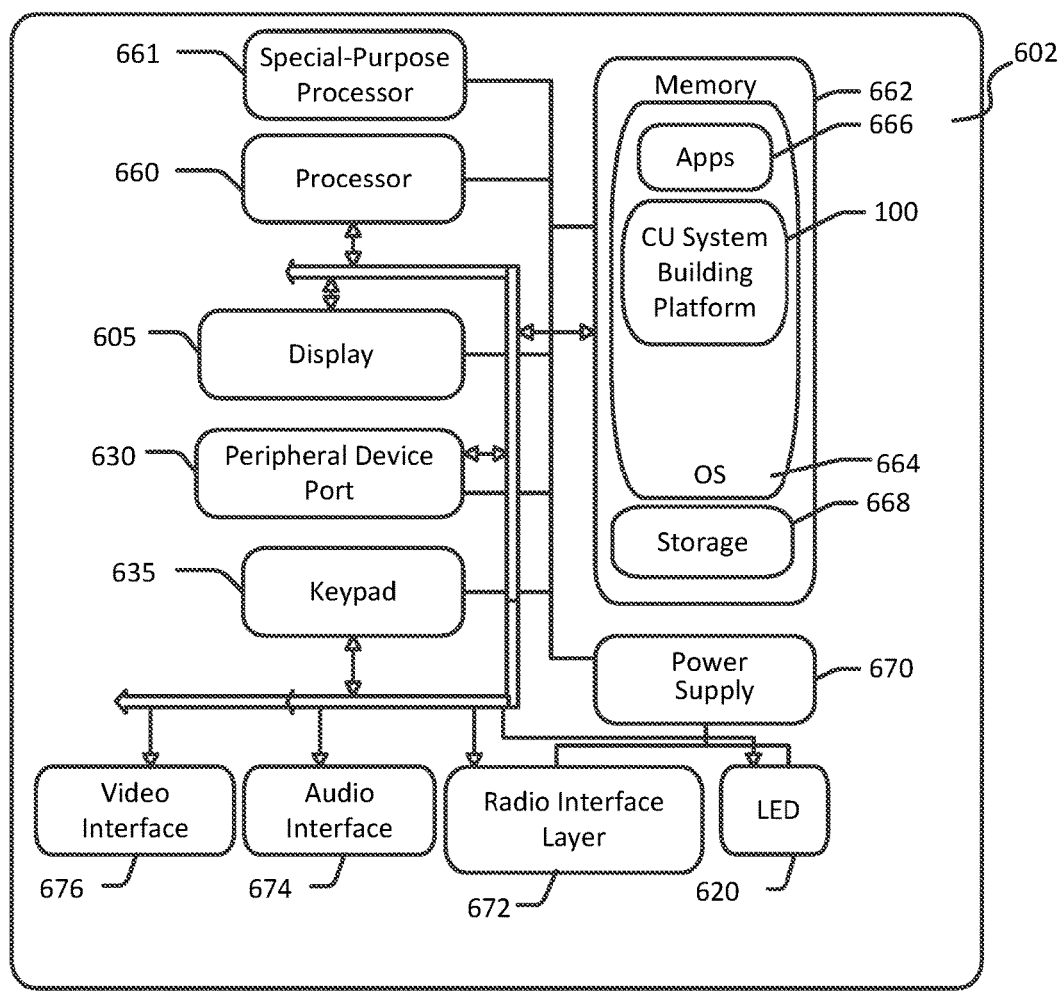
FIG. 10B is a simplified block diagram of the mobile computing device shown in FIG. 10A with which various aspects of the disclosure may be practiced.

FIGS. 10A and 10B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 10A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the CU system building platform 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 10B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 11:
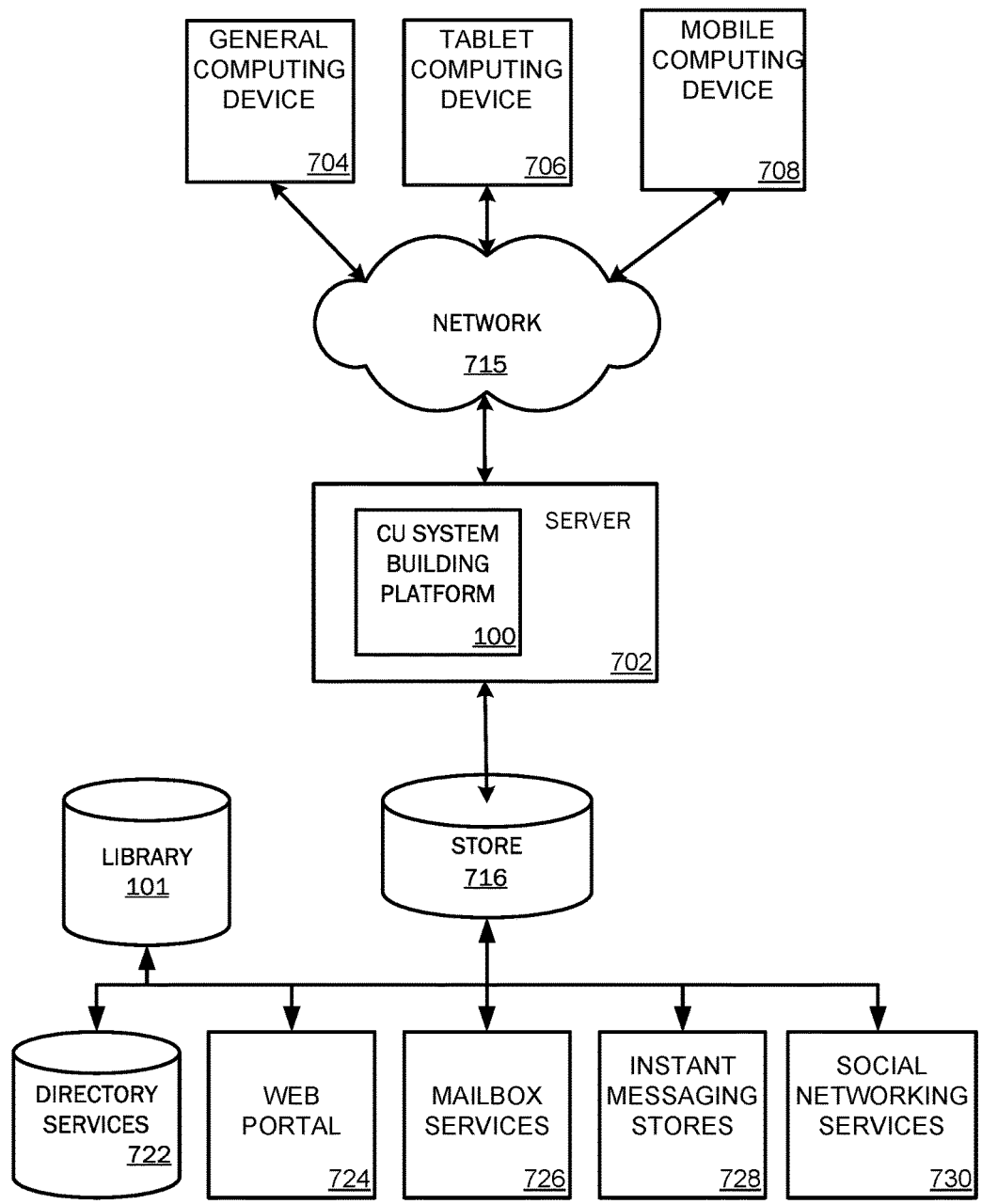
FIG. 11 is a simplified block diagram of a distributed computing system in which various aspects of the disclosure may be practiced.

FIG. 11 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, a social networking site 730 or library 101. By way of example, the CU system building platform 100 may be implemented in a general computing device 704, a tablet computing device 706 and/or a mobile computing device 708 (e.g., a smart phone). In some aspects, the server 702 is configured to implement a CU system building platform 100, via the network 715 as illustrated in FIG. 11.

Figure 12:
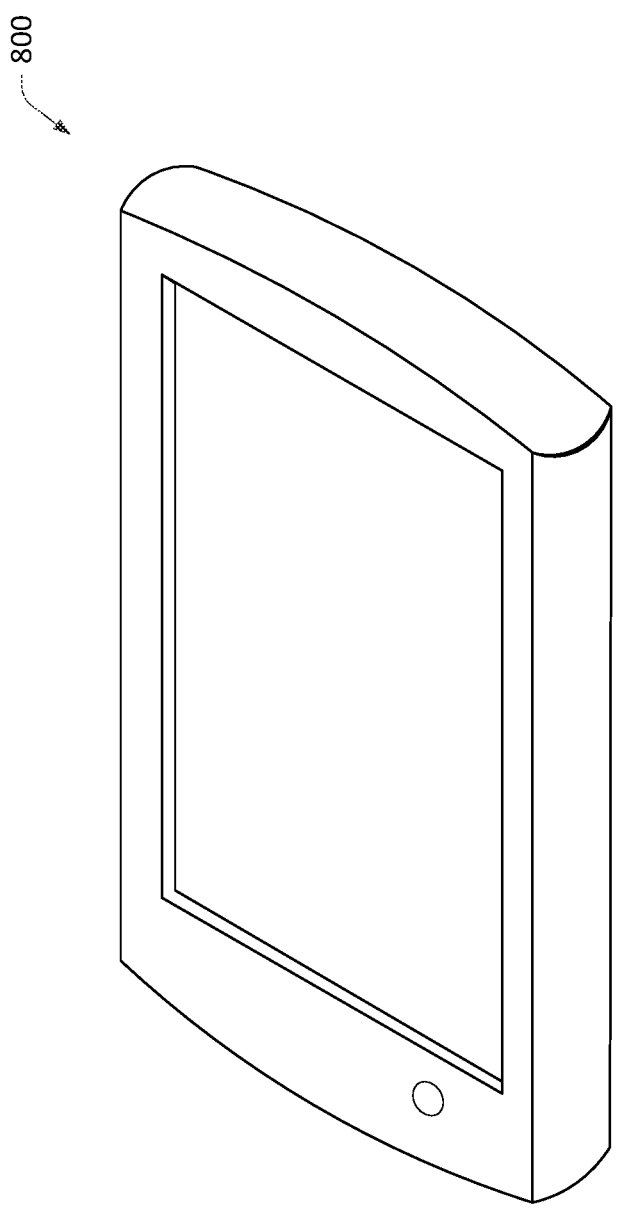
FIG. 12 illustrates a tablet computing device with which various aspects of the disclosure may be practiced

FIG. 12 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

One aspect of the disclosure is directed to a system. The system includes at least one processor and a memory. The memory encodes computer executable instruction that, when executed by the at least one processor, are operative to:
provide a library of prebuilt conversational items;
provide a user interface for selecting one or more prebuilt conversational items from the library;
receive a selection of at least one prebuilt conversational item from a builder to form a selected item set;
form a conversational component based on the selected item set; and
implement the conversational component to create the conversational understanding system.

The prebuilt conversational items may include one or more task specific templates and/or one or more subtask modules. The prebuilt conversational items may include preconfigured parameters, preconfigured constraints, a preconfigured inheritance, and preconfigured structure. The selected item set may be capable of implementation upon selection without requiring any further input from the builder.

The at least one processor may be further operative to provide an option to customize the selected item set and to receive customizations for the selected item set from the builder. The forming of the conversational component may be further based on the customizations. The option to customize may include at least one of:
select a preconfigured parameter;
select a preconfigured constraint;
remove a preconfigured parameter;
remove a preconfigured constraint;
build and add a non-preconfigured parameter;
build and add a non-preconfigured constraint;
order parameters; and
order the selected item set.

The conversational component may be based on the selected item set and may include automatically combining any selected conversational item in the selected item set by integrating the preconfigured inheritance and the preconfigured structure. The selected item set may include a first task specific template and a second task specific template. The forming of the conversational component based on the selected item may also include automatically combining the first task specific template with the second task specific template by integrating the preconfigured inheritance and the preconfigured structure between the first task specific template and the second task specific template; determining common required information between the first task specific template and the second task specific template; and linking the common required information for synchronized data population. The automatic combination of the first task specific template with the second task specific template may further be performed by determining shared subtasks modules between the first task specific template and the second task specific template and removing one of the shared subtask modules. The at least one processor may further be operative to create the library of prebuilt conversational items. Alternatively, the selected item set may include a first subtask module and a second subtask module and the conversational component based on the selected item may include automatically combining the first subtask module and the second subtask module by integrating the preconfigured inheritance and the preconfigured structure between the first subtask module and the second subtask module, determining common required information between the first subtask module and the second subtask module, and linking the common required information for synchronized data population. In another alternative, the selected item set may include a first task specific template and a first subtask module. In this alternative, the forming of the conversational component based on the selected item set may include automatically combining the first task specific template and the first subtask module by integrating the preconfigured inheritance and the preconfigured structure between the first task specific template and the first subtask module, determining common required information between the first task specific template and the first subtask module, and linking the common required information for synchronized data population. In a further alternative, the selected item set may include a first task specific template, a second task specific template, a first subtask module, and a second subtask module. In this alternative, the conversational component based on the selected item set may include automatically combine the first task specific template, the second task specific template, the first subtask module, and the second subtask module by: integrating the preconfigured inheritance and the preconfigured structure between the first task specific template, the second task specific template, the first subtask module, and the second subtask module; determining common required information the first task specific template, the second task specific template, the first subtask module, and the second subtask module; and linking the common required information for synchronized data population; determining shared subtask modules between the first task specific template and the second task specific template; and/or linking the shared subtask modules for synchronized data population. The at least one processor may further be operative to receive an implementation request. The implementation of the conversational component to create the conversational understanding system may be performed in response to the implementation request. The at least one processor may be further operative to provide a search interface for the prebuilt conversational items, receive a query for the search interface, retrieve one or more prebuilt conversational items from the library based on the query, and present the retrieved one or more prebuilt conversational items for selection. The search interface may be part of the user interface. The conversational understanding system may be built for a specific application, such as a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, a device control application, a web interface application, an exchange application, and/or a calendaring application. The system may be a server or a network of servers.

Another aspect of the disclosure includes a computer readable storage medium. The computer storage medium stores computer executable instructions. The computer executable instruction when executed by a computing device, cause the computing device to perform a method. The method comprising:
- accessing a library of prebuilt conversational items;
- providing a user interface for selecting one or more prebuilt conversational items from the library;
- receiving a selection of at least one prebuilt conversational item from a builder to form a selected item set;
- receiving an implementation request from the builder via the user interface; and
- in response to the implementation request, implementing the selected item set to create a conversational understanding system.

The prebuilt conversational items may include one or more task specific templates and/or one or more subtask modules. The prebuilt conversational items may include preconfigured parameters, preconfigured constraints, a preconfigured inheritance, and/or a preconfigured structure. The conversational component may be capable of being formed and implemented without requiring any input from the builder. The method may further include providing an option to customize the selected item set and receiving customizations for the selected item set from the builder. The forming the conversational component may be further based on the customizations. Additionally, the option to customize may include removing a preconfigured parameter and/or removing a preconfigured constraint. Alternatively, the forming of the conversational component based on the selected item set may include automatically combining any selected conversational item in the selected item set by integrating the preconfigured inheritance and the preconfigured structure. The library may include a task specific template repository and a subtask module repository.

Yet another aspect of the disclosure includes a method for building a conversational understanding system. The method includes:
- providing a library of prebuilt conversational items;
- providing a user interface for selecting the prebuilt conversational items from the library;
- receiving a selection of at least one prebuilt conversational item from a builder to form a selected item set;
- forming a conversational component based on the selected item set; and
- implementing the conversational component to create the conversational understanding system.

The prebuilt conversational items may include one or more task specific templates and/or one or more subtask modules. The prebuilt conversational items may include preconfigured parameters, preconfigured constraints, a preconfigured inheritance, and/or a preconfigured structure. The conversational component may be capable of being formed and implemented without requiring any input from the builder.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for building a conversational understanding system, the system comprising:
   at least one processor; and
   a memory for storing and encoding computer executable instructions that, when executed by the at least one processor is operative to:
   provide a library of prebuilt conversational items, wherein the library of the prebuilt conversational items includes a plurality of task specific templates, wherein at least one of the plurality of task specific templates includes a task-independent subtask module, and wherein the prebuilt conversational items include preconfigured parameters and a preconfigured structure;
   provide a user interface for selecting one or more prebuilt conversational items from the library;
   receive a selection of a first prebuilt conversational item and a second prebuilt conversational item;
   automatically generate a conversational component, based at least upon the selection, by integrating the first prebuilt conversational item and the second prebuilt conversational item based on a first preconfigured inheritance of the first prebuilt conversational item and a second preconfigured inheritance of the second prebuilt conversational item; and
   provide a conversational understanding system based on the conversational component.

2. The system of claim 1, wherein the at least one processor is further operative to:
   provide an option to customize the first prebuilt conversational item and the second prebuilt conversational item; and
   receive customizations for the first prebuilt conversational item and the second prebuilt conversational item.

3. The system of claim 2, wherein the option to customize includes at least one of:
   select a preconfigured parameter;
   select a preconfigured constraint;
   remove a preconfigured parameter;
   remove a preconfigured constraint;
   build and add a non-preconfigured parameter;
   build and add a non-preconfigured constraint;
   order parameters; and
   order the selected item set.

4. The system of claim 1, wherein:
automatically integrating the first prebuilt conversational item and the second prebuilt conversational item is further based on a first preconfigured structure of the first prebuilt conversational item and a second preconfigured structure of the second prebuilt conversational item.

5. The system of claim 1, wherein the first prebuilt conversational item comprises a first task specific template and the second prebuilt conversational item comprises a second task specific template, and
wherein automatically generating the conversational component includes:
automatically combining the first task specific template with the second task specific template by:
integrating the first preconfigured inheritance and the second preconfigured inheritance;
determining common required information between the first task specific template and the second task specific template; and
linking the common required information for synchronized data population.

6. The system of claim 5, wherein the automatic combination of the first task specific template with the second task specific template is further performed by:
determining common task-independent subtask modules between the first task specific template and the second task specific template; and
removing one of the common task-independent subtask modules.

7. The system of claim 1, wherein the at least one processor is further operative to:
create the library of prebuilt conversational items.

8. The system of claim 1, wherein the first prebuilt conversational item comprises a first task-independent subtask module and the second prebuilt conversational item comprises a second task-independent subtask module, and
wherein generate the conversational component comprises:
automatically combine the first task-independent subtask module and the second task-independent subtask module by:
integrating the first preconfigured inheritance and the second preconfigured inheritance;
determining common required information between the first task-independent subtask module and the second task-independent subtask module; and
linking the common required information for synchronized data population.

9. The system of claim 1, wherein the first prebuilt conversational item includes a first task specific template and the second prebuilt conversational item includes a first task-independent task module, and
wherein generate the conversational component comprises:
automatically combine the first task specific template and the first task-independent subtask module by:
integrating the first preconfigured inheritance and the second preconfigured inheritance;
determining common required information between the first task specific template and the first subtask module; and
linking the common required information for synchronized data population.

10. The system of claim 1, wherein the first prebuilt conversational item includes a first task specific template and a first task-independent subtask module, wherein the second prebuilt conversational item includes a second task specific template and a second task-independent subtask module, and
wherein automatically generating the conversational component comprises:
automatically combining the first task specific template, the second task specific template, the first subtask module, and the second subtask module by:
integrating preconfigured inheritances and preconfigured structures among the first task specific template, the second task specific template, the first subtask module, and the second subtask module;
determining common required information the first task specific template, the second task specific template, the first subtask module, and the second subtask module, based on the integrated preconfigured inheritances and preconfigured structures; and
linking the common required information for synchronized data population.

11. The system of claim 10, further comprising:
wherein automatically combine the first task specific template, the second task specific template, the first subtask module, and the second subtask module is further performed by:
determining common task-independent subtask modules between the first task specific template and the second task specific template; and
linking the common task-independent subtask modules for synchronized data population.

12. The system of claim 1, wherein the at least one processor is further operative to:
receive an implementation request; and
responsive to the received implementation request, provide the conversational understanding system.

13. The system of claim 1, wherein the at least one processor is further operative to:
provide a search interface for the first prebuilt conversational items, wherein the search interface is part of the user interface;
receive a query for the search interface;
retrieve one or more prebuilt conversational items from the library based on the query; and
present the retrieved one or more prebuilt conversational items for selection.

14. The system of claim 1, wherein the conversational understanding system is built for a specific application, the specific application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
a device control application;
a web interface application;

an exchange application; or a calendaring application.

15. The system of claim 1, wherein the system is a server or a network of servers.

16. A method for building a conversational understanding system, the method comprising:

provifing a library of prebuilt conversational items, wherein the library of the prebuilt conversational items includes a plurality of task specific templates, wherein one or more of the plurality of task specific templates comprise a task-independent subtask module, and wherein the prebuilt conversational items include preconfigured parameters and a preconfigured structure;

providing a user interface for selecting one or more prebuilt conversational items from the library;

receiving a selection of a first prebuilt conversational item and a second prebuilt conversational item;

automatically generating a conversational component based at least upon the selection, wherein generating the conversational component comprises:

combining the received first prebuilt conversational item and the second prebuilt conversational item by integrating a first preconfigured inheritance of the first prebuilt conversational item and a second preconfigured inheritance of the second prebuilt conversational item; and providing a conversational understanding system based on the conversational component.

17. The method of claim 16, further comprising:

providing an option to customize the first prebuilt conversational item and the second prebuilt conversational item; and receiving customizations for the first prebuilt conversational item and the second prebuilt conversational item, wherein the option to customize includes at least one of:

removing a preconfigured parameter; and removing a preconfigured constraint.

18. The method of claim 16, wherein generating the conversational component further comprises:

automatically integrating a first preconfigured structure of the first prebuilt conversational item and the first preconfigured inheritance with a second preconfigured structure of the second prebuilt conversational item and the second preconfigured inheritance of the second prebuilt conversational item.

19. The method of claim 16, wherein the library comprises a task specific template repository and a task-independent subtask module repository.

20. A computer readable storage medium storing computer executable instructions which, when executed by a computing device, cause the computing device to perform a method comprising:

accessing a library of prebuilt conversational items, wherein the prebuilt conversational items comprise: a task specific template and a subtask module, and wherein the prebuilt conversational items include preconfigured parameters and a preconfigured structure;

providing a user interface for selecting one or more prebuilt conversational items from the library;

receiving a selection of at least two prebuilt conversational items through the user interface;

based at least upon the selection, automatically combining the at least two prebuilt conversational items based on a first structure and a first inheritance of a first selected prebuilt conversational item and a second structure and a second inheritance of a second selected prebuilt conversational item;

receiving a provisioning request; and in response to the provisioning request, providing a conversational understanding system based on a conversational component.

* * * * *